(12) United States Patent
Disney et al.

(10) Patent No.: US 6,289,388 B1
(45) Date of Patent: *Sep. 11, 2001

(54) SYSTEM FOR COMMUNICATING HETEROGENEOUS COMPUTERS THAT ARE COUPLED THROUGH AN I/O INTERCONNECTION SUBSYSTEM AND HAVE DISTINCT NETWORK ADDRESSES, VIA A SINGLE NETWORK INTERFACE CARD

(75) Inventors: William W. Disney, Downingtown; Robert A. Johnson, Pottstown; Dwayne E. Ebersole, Lancaster, all of PA (US)

(73) Assignee: Unisys Corporation, Blue Bell, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/088,421

(22) Filed: Jun. 1, 1998

Related U.S. Application Data

(60) Provisional application No. 60/048,723, filed on Jun. 2, 1997.

(51) Int. Cl.[7] .............................. G06F 15/16; H04L 12/28
(52) U.S. Cl. .......................... 709/238; 709/250; 370/401
(58) Field of Search .................................... 709/250, 230, 709/203, 205, 208, 212, 220, 237, 238, 239, 248, 249, 204, 252; 710/36, 38, 128, 131; 370/401, 402, 403, 404, 405, 406, 407, 408

(56) References Cited

U.S. PATENT DOCUMENTS 3,400,372   9/1968   Beausoleil et al. ............... 340/172.5

(List continued on next page.)

FOREIGN PATENT DOCUMENTS

WO 95/01023 * 1/1995 (WO) ............................. H04L/12/18
WO 97/01944   1/1997 (WO) .
WO 98/56150  12/1998 (WO) .

OTHER PUBLICATIONS

Cisco, Cisco IOS software release 11.1 New feature, htt://www.cisco.com/wrap/public/c...mkt/ios/rel/111/prodlit/402_pp.htm, 23 pages Feb. 1996.*

(List continued on next page.)

Primary Examiner—Le Hien Luu
Assistant Examiner—Bunjob Jaroenchonwanit
(74) Attorney, Agent, or Firm—Woodcock Washburn Kurtz, Mackiewicz & Norris; Mark T. Starr; Lise A. Rode

(57) ABSTRACT

A first network protocol provider, executing on a first computer system and having a first network address associated therewith, and a second network protocol provider, executing on a second computer system and having a second network address associated therewith, share a same network interface card installed on the second computer system. Apparatus providing this ability comprises an interconnection between the first and second computer systems over which data can be transferred between them, and a router executing on the second computer system that routes data among the first network protocol provider (via the interconnection), the second network protocol provider, and the network interface card in a manner that enables the network interface card to be shared between the first and second network protocol providers. For example, when data is received from the network by the network interface card, the router routes the data to the first network protocol provider, via the interconnection, when a network address received with the data matches the first network address, but passes the received data to the second network protocol provider when the network address received with the data matches the second network address. A "loopback" capability also allows data addressed from one network protocol provider to the other to be transmitted between them directly (via the interconnection), bypassing the network interface card. The router can also handle broadcast addresses.

24 Claims, 20 Drawing Sheets

U.S. PATENT DOCUMENTS

| | | | |
|---|---|---|---|
| 4,155,117 | | 5/1979 | Mitchell et al. ..................... 364/200 |
| 4,414,620 | | 11/1983 | Tsuchimoto et al. ................ 364/200 |
| 5,093,780 | | 3/1992 | Sunahara ............................. 395/800 |
| 5,117,486 | | 5/1992 | Clark et al. .......................... 395/250 |
| 5,247,616 | | 9/1993 | Berggren et al. .................... 395/200 |
| 5,321,817 | | 6/1994 | Feinstein ............................. 395/325 |
| 5,371,852 | * | 12/1994 | Attansio et al. ..................... 395/200 |
| 5,379,296 | | 1/1995 | Johnson et al. ........................ 370/60 |
| 5,381,534 | | 1/1995 | Shi ...................................... 395/200 |
| 5,459,836 | | 10/1995 | Whittaker et al. ............. 395/200.07 |
| 5,528,765 | * | 6/1996 | Milligan .............................. 710/107 |
| 5,561,806 | | 10/1996 | Fitchett et al. ....................... 395/800 |
| 5,581,709 | | 12/1996 | Ito et al. ......................... 395/200.15 |
| 5,581,741 | | 12/1996 | Clark et al. .......................... 395/500 |
| 5,612,953 | | 3/1997 | Olnowich ............................. 370/367 |
| 5,630,061 | * | 5/1997 | Richter et al. .................. 395/200.02 |
| 5,634,015 | | 5/1997 | Chang et al. ........................ 395/309 |
| 5,640,541 | * | 6/1997 | Bartram et al. ...................... 395/500 |
| 5,648,965 | | 7/1997 | Thadani et al. ...................... 370/241 |
| 5,655,140 | | 8/1997 | Haddock .............................. 395/200 |
| 5,669,002 | | 9/1997 | Buch .................................... 395/726 |
| 5,701,423 | * | 12/1997 | Crozier ................................ 395/335 |
| 5,754,799 | * | 5/1998 | Hiles .................................... 710/110 |
| 5,774,665 | * | 6/1998 | Jeong et al. .......................... 709/218 |
| 5,790,548 | * | 8/1998 | Sistanizadeh et al. ............... 370/401 |
| 5,815,668 | * | 9/1998 | Hashimoto ........................... 709/238 |
| 5,841,990 | * | 11/1998 | Picazo, Jr. et al. ................... 709/249 |
| 5,867,648 | * | 2/1999 | Foth et al. ............................ 709/230 |
| 5,909,546 | * | 6/1999 | Osborne ............................... 709/212 |
| 5,911,776 | * | 6/1999 | Guck .................................... 709/217 |
| 5,912,891 | * | 6/1999 | Kanai ................................... 370/395 |
| 5,913,028 | * | 6/1999 | Wang et al. .......................... 709/203 |
| 5,923,654 | * | 7/1999 | Schnell ................................. 370/390 |
| 5,925,097 | * | 7/1999 | Gopinath et al. .................... 709/200 |
| 5,991,817 | * | 11/1999 | Rowett et al. ........................ 709/250 |
| 6,003,105 | * | 12/1999 | Vicard et al. ........................ 710/129 |

OTHER PUBLICATIONS

Polaris Press Release "Polaris Communications and Microsoft Team Up to Provide system 2000 gateway for Microsoft SNA server", 3 p. Jun. 1995.*

Comer, Internetworking with TCP/IP, 3rd. ed., 2p. 1995.*

Polaris White Paper "TCP/IP to SNA Connectivity with channel–Attach Gateways", 25 p. 1996.*

Polaris : thge fundamentals of Mainframe Channels for Network Professionals, 15 pg. 1996.*

Olaf, The Linux Network Administrators' Guide, p. s1–91, 1994.*

ClearPath HMP NX Series with Windows NT Network Services Implemenation Guide (Part No. 4198 6670) (Feb. 1997).

ClearPath HMP NX and A Series BNA/CNS Network Implementation Guide, vol. 2: Configuration (Part No. 3789 7014) (Jun. 1996).

ClearPath HMP NX Series with Windows NT Implementations and Operations Guide (Part No. 8807 6542) (Feb. 1997).

ClearPath HMP NX Series with Windows NT Migration Guide (Part No. 8807 7730) (Feb. 1997).

ClearPath HMP NX and A Series Networking Capabilities Overview (Part No. 3789 7139) (Jun. 1996).

ClearPath HMP NX and A Series Networking Operations Reference Manual, vol. 1: Commands and Inquiries (A through N) (Part No. 3787 7917) (Jun. 1996).

ClearPath HMP NX and A Series Networking Operations Reference Mannual, vol. 2: Commands and Inquiries (O through Z) (Part No. 3787 7917) (Jun. 1996).

ClearPath HMP NX and A Series Networking Products Installation Guide (Part No. 4198 4840) (Jun. 1996).

* cited by examiner

QSP:

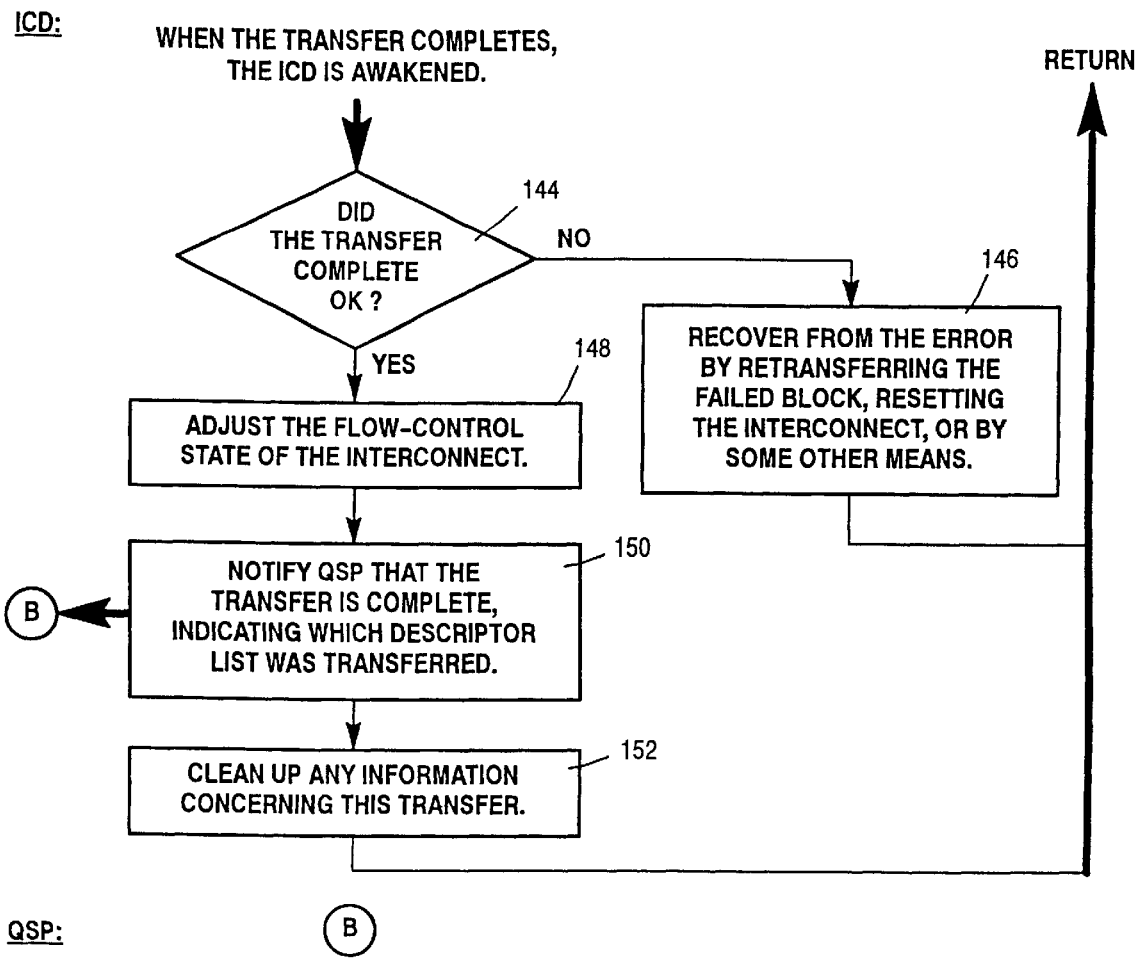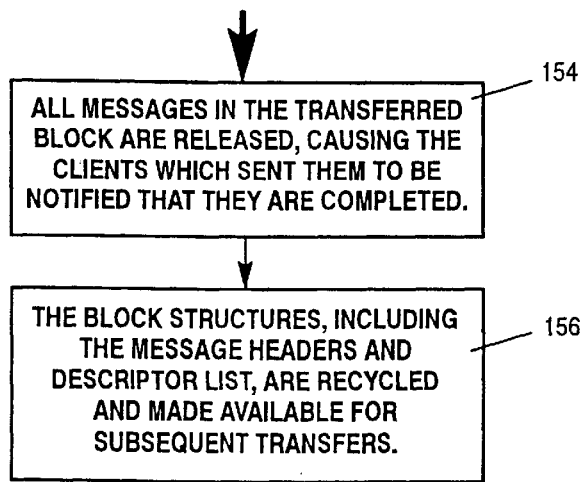
Figure 6D

```
if (rcvd_frame_ptr->MAC_hdr.length <= 1500) {          200
    /* frame is an 802.3 frame */
                                                  202
    if (rcvd_frame_ptr->LLC_hdr.DSAP == 0xAA) {
        /* frame is a SNAP frame */
                                                         204
        if (rcvd_frame_ptr->LLC_hdr.control == 0x03) {
            /* frame is a UI frame */
            switch (rcvd_frame_ptr->SNAP_hdr.type) {
                case 0x0800:
                    type_of_frame_rcvd = IP;
                    break;
                case 0x0806:
                    type_of_frame_rcvd = ARP;          206
                    break;
                default:
                    type_of_frame_rcvd = UNKNOWN;
                    break;
            }
        } else {                                      208
            type_of_frame_rcvd = UNKNOWN;
    } else if (rcvd_frame_ptr->LLC_hdr.DSAP == 0x04) {       210
        if (lookup_source_addr(rcvd_frame_ptr-> MAC_hdr.source_addr, &stn_ptr)) {
            type_of_frame_rcvd = BNA;      212
        } else {
            type_of_frame_rcvd = UNKNOWN;
        }                                              214
    } else {
        type_of_frame_rcvd = UNKNOWN;
    }
} else {
    /* frame is either an Ethernet frame or a large BNA frame */
    /* find out if the frame is a large BNA frame */
```

*Figure 9A*

```
if (rcvd_frame_ptr->LLC_hdr.DSAP == 0x04) {  ⎯216                              218
        if (lookup_source_addr(rcvd_frame_ptr->MAC_hdr.source_addr, &stn_ptr)) {⎯⎯
                type_of_frame_rcvd = BNA;  ⎯⎯ 220
        } else {                                        222
                type_of_frame_rcvd = UNKNOWN;  ⎯⎯
        }
} else {
        /* must be an IP or ARP frame */
        switch (rcvd_frame_ptr->MAC_hdr.type) {
                case 0x0800:
                        type_of_frame_rcvd = IP;
                        break;
                case 0x0806:
                        type_of_frame_rcvd = ARP;                  ⎯ 224
                        break;
                default:
                        type_of_frame_rcvd = UNKNOWN;
                        break;
        }
    }
}
switch (type_of_frame_rcvd) {
    case IP:
    case AR.:
            /* determine routing of frame based on destination IP address */
            if (rcvd_frame_ptr->IP_hdr.dest_addr == IP_BROADCAST_ADDR) {  ⎯226
                    ip_addr_owner = A Series & NT;
            } else {
                    /* first, assume that IP address is owned by neither A Series or NT */
                    ip_addr_owner = NEITHER;  ⎯⎯ 228
                    /* determine if IP address is either the A Series Server's and/or the
```

*Figure 9B*

```
                    ┌  NT Server's multicast address list */
                    │  if (rcvd_frame_ptr->IP_hdr.dest_addr "in" A Series multicast_addr_list)
              230 ─┤       ip_addr_owner = A Series;
                    │  if (rcvd_frame_ptr->IP_hdr.dest_addr "in" NT multicast_addr_list)
                    └       ip_addr_owner &= NT;
              }
                    ┌  /* route the frame */
                    │  if (ip_addr_owner == A Series) {
                    │       /* send it up to LANSG for forwarding to TCP/IP on A Series server */
                    │  } else if (ip_addr_owner == NT) {
                    │       /* forwarding it to NT's TCPIP.SYS */
              232 ─┤  } else {
                    │       /* determine who to send it to based on the values of
                    │             EnableIPRoutingInMCP and EnableIPRouting in Registry */
                    │  }
                    └  break;
                    ┌  case BNA:
              234 ─┤       /* send it directly to the LANSG passing the correct stn_ptr */
                    └  break;
                    ┌  case UNKNOWN:
              236 ─┤       /* forward it up through NDIS */
                    └  break;
              default:
                       /* shouldn't happen */
                       break;
       }
```

Figure 9C

SYSTEM FOR COMMUNICATING HETEROGENEOUS COMPUTERS THAT ARE COUPLED THROUGH AN I/O INTERCONNECTION SUBSYSTEM AND HAVE DISTINCT NETWORK ADDRESSES, VIA A SINGLE NETWORK INTERFACE CARD

CROSS-REFERENCE TO RELATED APPLICATIONS

This is a regular U.S. patent application based on provisional application Ser. No. 60/048,723, filed Jun. 2, 1997, entitled "Apparatus and Method for a Cooperative Networking Platform," the entire contents of which are hereby incorporated by reference. A claim for priority has been made under 35 U.S.C. § 119(e).

This application is related to co-pending application Ser. No. 09/088,552 filed Jun. 1, 1998, entitled "Virtual Lan Interface For High-Speed Communications Between Heterogeneous Computer Systems", which is also hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention relates to the field of computer networking, and, more particularly, to apparatus and methods for allowing two computer systems to access a network via a shared network interface card installed on one of them.

2. Description of the Prior Art

The ability for heterogeneous computer systems to communicate with each other over a network using standard and/or proprietary networking protocols is known. Most computer systems have some form of networking architecture that enables the computer system to perform networking in accordance with those protocols. Such a networking architecture typically comprises both system software and hardware. FIG. 1 is a block diagram illustrating the components of a networking architecture employed by a Unisys A Series enterprise server 10 in order to communicate with other hosts, or nodes, on a network 15.

The A Series enterprise server 10 executes the Unisys MCP operating system 12, and has an I/O subsystem that comprises one or more I/O Modules (IOM) 14 housed within the A Series chassis. The IOM 14 implements a Unisys proprietary I/O bus architecture referred to as CS-BUS II or CS-Bus III (hereinafter "the CS Bus"). A plurality of card slots, e.g. slots 16a–d, are provided for connecting interface cards, referred to as "channel adapters", into the CS Bus. Different groups, or racks, of channel adapter slots are each controlled by a Channel Manager Unit (CMU) (e.g., CMUs 18a, 18b). An IOM can contain several CMUs, each of which controls a different rack of channel adapter card slots via the CS-Bus. The CMUs manage the physical and data layers of the I/O process.

Channel adapter cards, which each may occupy one or more channel adapter card slots within the IOM 14, provide various connectivity solutions for the A Series enterprise server 10. For example, Unisys provides a channel adapter card that implements the Small Computer System Interface (SCSI) protocol for connecting SCSI peripherals to the enterprise server.

For network connectivity, Unisys provides several channel adapters to support various physical networking protocols. These channel adapters are generally referred to as network processors (NP). For example, Unisys ICP22 and ICP26 network processors are channel adapter cards that implement the Ethernet network protocol and can be used to connect an A Series enterprise server to an Ethernet network. Unisys also provides network processors for connectivity to FDDI and ATM networks. As shown in FIG. 1, a number of different network processors (e.g., NPs 20a, 20b, and 20c) can be installed in respective channel adapter slots (e.g., slots 16b, 16c, and 16d) of the IOM 14, in order to provide different network connectivity solutions.

As shown in the more detailed view of network processor 20c (installed in channel adapter slot 16d), a network processor may comprise a plurality of different lines, e.g., Line0, Line1 . . . LineN. A line represents a physical endpoint within a network. For example, the Unisys ICP22 network processor has two lines, each of which comprises a separate Ethernet connection—one line could be connected to one Ethernet network, and the other to a different Ethernet network.

Each line of a network processor can have one station group defined on that line. A station group consists of one or more stations. A station is a logical endpoint that represents a logical dialog on that line. Thus, more than one logical dialog can take place over a given line of a network processor. This is achieved through multiplexing. For example, with a connection-oriented networking protocol, such as the Burroughs Network Architecture—Version 2 protocol (BNAv2), one station may represent a logical dialog with one other BNAv2 host on the network, whereas another station may represent a logical dialog to a different BNAv2 host. As illustrated in FIG. 1, for example, Station0 of LineN may represent a logical dialog with BNAv2 host 22, and Station1 of LineN may represent a logical dialog with BNAv2 host 24. For networking protocols that are not connection-oriented, like the Internet Protocol (IP), only one station needs to be defined to handle all communications for that protocol stack. For example, in FIG. 1, StationN of LineN could be defined as the logical endpoint for all IP traffic over LineN. A Local Area Network Station Group (LANSG) module 26, which comprises software executing on the network processor 20c, provides callable procedures for creating and maintaining stations and station groups on the various lines of the network processor 20d and for sending and receiving data over them.

Other software components that execute on the network processor 20d include a Queue Service Provider (QSP) module 28, which handles the multiplexing and demultiplexing of data for all stations defined on a given NP, and two stub modules—a Network Services Manager stub (NSM-stub) 30 and a Link Layer Manager stub (LLM-stub) 32—which interface with corresponding modules of a Core Network Services (CNS) software component 34, to and from modules within the MCP environment.

Generally, a network processor (e.g., NP 20a, 20b, or 20c) implements the data link and physical layers of the 7-layer ISO Reference Model. Higher level networking protocols that a client application 46 may wish to employ in order to communicate with applications running on different hosts of the network 15, such as the BNAv2 and TCP/IP networking protocols, are implemented as network protocol providers on the A Series system 10. A network protocol provider is a software module that implements these higher level networking protocols. For example, Unisys provides both BNAv2 Host Resident Network Provider (HRNP) modules and TCP/IP HRNP modules. In the example of FIG. 1, a BNAv2 HRNP 42 and a TCP/IP HRNP 44 are shown.

The Core Network Services (CNS) software 34 provides support for the network protocol providers 42, 44 and handles the initialization and maintenance of network processors and the station groups defined thereon. Specifically, CNS 34 comprises a Network Services Manager (NSM) 36 that initializes and manages the network processors (e.g., 20a, 20b, 20c) installed in the system, and a Link Layer Manager (LLM) 38 that initializes and maintains the identity and attributes of each station group defined on a given network processor. Another component (not shown) of CNS 34 validates attributes associated with station groups and stations created on a network processor. These attributes are passed between the network processor and CNS 34 via a control dialog when the stations are defined. Like the stub procedures for the NSM and LLM modules 36, 38, network processors also have a stub procedure (LLAH, not shown) that corresponds to the attribute handler of CNS 34. An NPSUPPORT software library 40, as well as portions of the MCP operating system 12, provide routines and procedure calls that serve as an interface between a network processor and the CNS 34 and network protocol providers 42, 44, and control loading of software to the NPs and dumping of their state.

Each network processor has an associated identifier that uniquely identifies that network processor within the system 10. When a network processor is initialized and brought on-line, the NSM-stub 30 in the network processor interfaces with the NSM 36 of CNS 34 via a control dialog in order to pass its identifier to the NSM 36. The NSM 36 manages the identifiers of all active network processors.

Each station group and station defined for a given network processor also has a unique identifier associated with it. Via a control dialog established between the LLM-stub 32 on the network processor and the LLM 38 of CNS 34, the station and station group identifiers are passed to the LLM 38 during initialization. Within the LLM 38, a station corresponds to a connection, and a station group corresponds to a connection group.

As mentioned above, the ability to define multiple stations (i.e., a station group) on a single physical line of a network processor is achieved through multiplexing. Specifically, the QSP 28 in the network processor multiplexes inbound and outbound data for multiple stations on a given line. Moreover, the QSP is responsible for distributing request and response data between the NSM 36 and NSM-stub 30 and between the LLM 38 and LLM-stub 32. To that end, each entity on the network processor that receives outbound data from the MCP, including every station, the NSM-stub 30, and the LLM-stub 32, is assigned a unique Remote Queue Reference (RQR) by the QSP. The NSM-stub RQR is reported to the NSM 36 within CNS 34 via NPSUPPORT when the NP is loaded. The LLM-stub RQR is reported to the LLM 38 via the NSM 36 by the NSM-stub 30 when the NP initializes. All of the station RQRs are reported to the HRNPs as the stations open.

When a client application is required to send data via network 15 to some other host or node on the network 15, such as another BNAv2 Host or another TCP/IP host, it invokes the services of the appropriate network protocol provider, e.g., 42, 44. The network protocol provider 42, 44 determines the appropriate network processor and station on which the data is to be output, adds protocol headers, and makes a corresponding request to the MCP 12 that includes the identifier of the network processor and the RQR of the station. The data and associated RQR are passed from the MCP 12 to the QSP 28 on the network processor (e.g., network processor 20c), which, in combination with the LANSG module 26, sends the data out to the network 15 via the appropriate line (e.g., Line0, Line1, . . . or LineN) as part of the logical dialog represented by the designated station.

When data is received from the network 15 on a given line, the LANSG module 26 determines, from header information associated with the data, the station (i.e. logical dialog) for which the data is intended. The LANSG and QSP modules 26, 28, in combination with portions of the MCP 12 and NPSUPPORT library 40, pass the received data to the appropriate network protocol provider 42, 44 associated with that station, along with an indication of which station received the data. For example, one of the stations on LineN of the network processor 20c of FIG. 1 (e.g., station0) may be defined as the logical endpoint for the BNAv2 HRNP 42, while a different station (e.g., station1) may be defined as the logical endpoint on which all IP traffic over LineN is received for the TCP/IP HRNP 44. When a frame of data is received from the network on LineN, the LANSG module 26 determines from header information which of the network protocol providers (i.e., stations) is intended to receive the data. This determination is performed in accordance with the methods described in commonly assigned, U.S. Pat. No. 5,379,296, entitled "Method and Apparatus for Interfacing a Workstation to a Plurality of Computer Platforms" (Johnson et al.).

In addition to its use in A Series computers, the foregoing networking architecture is also employed in Unisys Clear-Path HMP NX enterprise servers. A ClearPath HMP NX server comprises an A Series enterprise server tightly integrated with a server running Microsoft Window NT. Please note that "Microsoft," "Windows," and "Windows NT" are registered trademarks of Microsoft Corporation. Additional information concerning the foregoing networking architecture can be found in the following documents, each of which is available from Unisys Corporation, assignee of the present invention, and each of which is hereby incorporated by reference in its entirety:

*ClearPath HMP NX Series with Windows NT Network Services Implementation Guide* (Part No. 4198 6670);

*BNA/CNS Network Implementation Guide, Volume* 2: *Configuration* (Part No. 3789 7014);

*ClearPath HMP NX Series with Windows NT Implementations and Operations Guide* (Part No. 8807 6542);

*ClearPath HMP NX Series with Windows NT Migration Guide* (Part No. 8807 7730);

*Networking Capabilities Overview* (Part No. 3789 7139)

*Networking Operations Reference Manual, Volumes* 1 *and* 2: *Commands and Inquiries* (Part No. 3787 7917); and

*Networking Products Installation Guide* (Part No. 4198 4840).

Using a Unisys ICP22 network processor, which is an Ethernet-based channel adapter, it has been possible in the past for a Unisys A Series enterprise server to communicate with a workstation or personal computer (PC) over a network. An example of this ability is illustrated in FIG. 2. In this example, the A Series enterprise server 10 communicates with an Intel-based workstation 48 running the Microsoft Windows NT operating system (hereinafter "the NT server"). The A Series enterprise server is connected to the network via network processor 20a, which may, for example, be a Unisys ICP22 Ethernet-based network processor.

The I/O subsystem of the NT server 48 comprises portions of the NT operating system kernel, an EISA or PCI bus 52, and appropriate device driver software. To provide network connectivity, a network interface card (NIC) 50 is installed in an available bus slot on the NT server 48. The NT server may support one or both of the PCI and EISA bus standards. NICs are available for both bus standards.

A NIC device driver 54 that typically is sold with the NIC card 50 is installed in the kernel space of the NT operating system. The NIC device driver 54 interfaces with a higher level network protocol provider, such as an implementation of the TCP/IP protocol. Microsoft Corporation provides an implementation of the TCP/IP protocol in the form of a kernel level device driver, also referred to as a transport protocol driver, named TCPIP.SYS 58. TCPIP.SYS 58 interfaces with the NIC device driver 54 via NDIS, an industry standard Network Driver Interface Specification jointly developed by Microsoft and 3Com. NDIS defines an interface for communication between hardware-independent protocol drivers, such as TCPIP.SYS, which implement the Data Link, Network, and Transport layers of the OSI model, and hardware-dependent NIC drivers which provide an interface to the NIC hardware and which correspond to the Physical Layer of the OSI model. A client program 60 on the NT server can communicate over the network 15 in accordance with the TCP/IP protocol by issuing suitable calls via the NT operating system to the TCPIP.SYS protocol driver.

Network interface cards and associated device drivers for NT servers are available from a number of Original Equipment Manufactures (OEMs). OEM NICs are available at relatively low cost for a variety of different network media standards, including Ethernet, Fast-Ethernet, etc. As new network standards evolve, OEMs are quick to design and produce NICs to support these standards. Because these NICs are developed for industry standard I/O bus architectures, such as EISA and PCI, which are found in the many computer systems today, the economies of scale result in fast cycle development times and extremely low prices for consumers.

On the contrary, it takes significantly longer and costs significantly more to design and produce a new network processor for a proprietary bus architecture, such as the CS-BUS II architecture of Unisys A Series enterprise servers. Vendors of proprietary systems cannot achieve the same economies of scale as the open system NIC vendors, and network processors, or NIC cards, for proprietary systems therefore typically cost significantly more than their open systems counterparts. To avoid the costs associated with the development of NIC cards for proprietary systems, it would be desirable if it were possible for two computer systems to each access a network via a shared network interface card installed on one of the systems. The present invention provides such a capability.

SUMMARY OF THE INVENTION

The present invention is directed to methods and apparatus that enable a first network protocol provider, executing on a first computer system and having a first network address associated therewith, and a second network protocol provider, executing on a second computer system and having a second network address associated therewith, to both send and receive data over a network via a same network interface card installed on the second computer system. In accordance with a preferred embodiment thereof, the present invention comprises an interconnection that couples the input/output (I/O) subsystem of the first computer system to the I/O subsystem of the second computer system and over which data can be transmitted between systems, and a router executing on the second computer system that routes data among the first network protocol provider (via the interconnection), the second network protocol provider, and the network interface card in a manner that enables the network interface card to be shared between the first and second network protocol providers. Specifically, when data is received from the network by the network interface card, the router routes the data to the first network protocol provider, via the interconnection, when a network address received with the data matches the first network address, but passes the received data to the second network protocol provider when the network address received with the data matches the second network address. Data received from the network with a broadcast address is routed to both the first (via the interconnection) and second network protocol providers. Outgoing data from each network protocol provider is routed to the network via that same network interface card. However, when outgoing data from one of the first and second network protocol providers is addressed to the other network protocol provider, a "loopback" capability enables the router to route that data directly from one network protocol provider to the other, bypassing the network interface card. Also, outgoing data from one of the first and second network protocol providers that has a broadcast address is routed to the network via the network interface card, and also to the other network protocol provider via the loopback path (bypassing the network interface card). In all cases, data routed between the first and second computer systems is transmitted over the interconnection. Additionally, it is understood that the present invention can be used to route data to and from a plurality of network protocol providers on the first computer system and/or a plurality of network protocol providers on the second system, via the same network interface card.

Preferably, the router simulates the operation of a network protocol provider when interfacing with a device driver of the network interface card, and the router simulates the operation of a device driver of the network interface card when interfacing with the first and second network protocol providers, whereby the functionality of the router is transparent to the network interface card and to the first and second network protocol providers.

The interconnection between the I/O subsystem of the first computer system and the I/O subsystem of the second computer system preferably comprises a physical connection between the I/O subsystems over which data can be transmitted between them, and an interconnection device driver on the second computer system that controls access by the second computer system to the physical connection. The interface between the interconnection device driver and other components on the second computer system is preferably implemented in the form of a procedure registration mechanism. In this manner, different interconnection device drivers can be installed on the second computer system for different physical connections, in a manner that is transparent to the other components of the present invention. For example, when the first and second computer systems are separate physical units, the physical connection may comprise suitable hardware (e.g., interface boards) installed in available slots of the I/O buses of each system and a cable that provide a connection between them. Alternatively, where the first computer system is emulated within the second system, the physical connection may be emulated within the second system in the form of a memory-to-memory connection.

One advantage of the present invention is that it can be used to enable a computer system that has a proprietary I/O subsystem to access a network via a standard network interface card developed for a more open, or widely used I/O subsystem such as that found in systems that support the Microsoft Windows NT operating system. This avoids the need to develop network interface cards for the proprietary system as new networking protocols and standards evolve. Instead, the present invention allows the proprietary system to share network interface cards designed for the open system.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIGS. 6A–F are flow diagrams that further illustrate the operation of the interconnections illustrated in FIGS. 3–5;

FIGS. 9A–9C comprise a pseudocode listing illustrating further details of one embodiment of the routing functionality of the router of the present invention, and also one embodiment of a method of the present invention;

DETAILED DESCRIPTION OF THE PREFERRED EMBODIMENT

Figure 1:
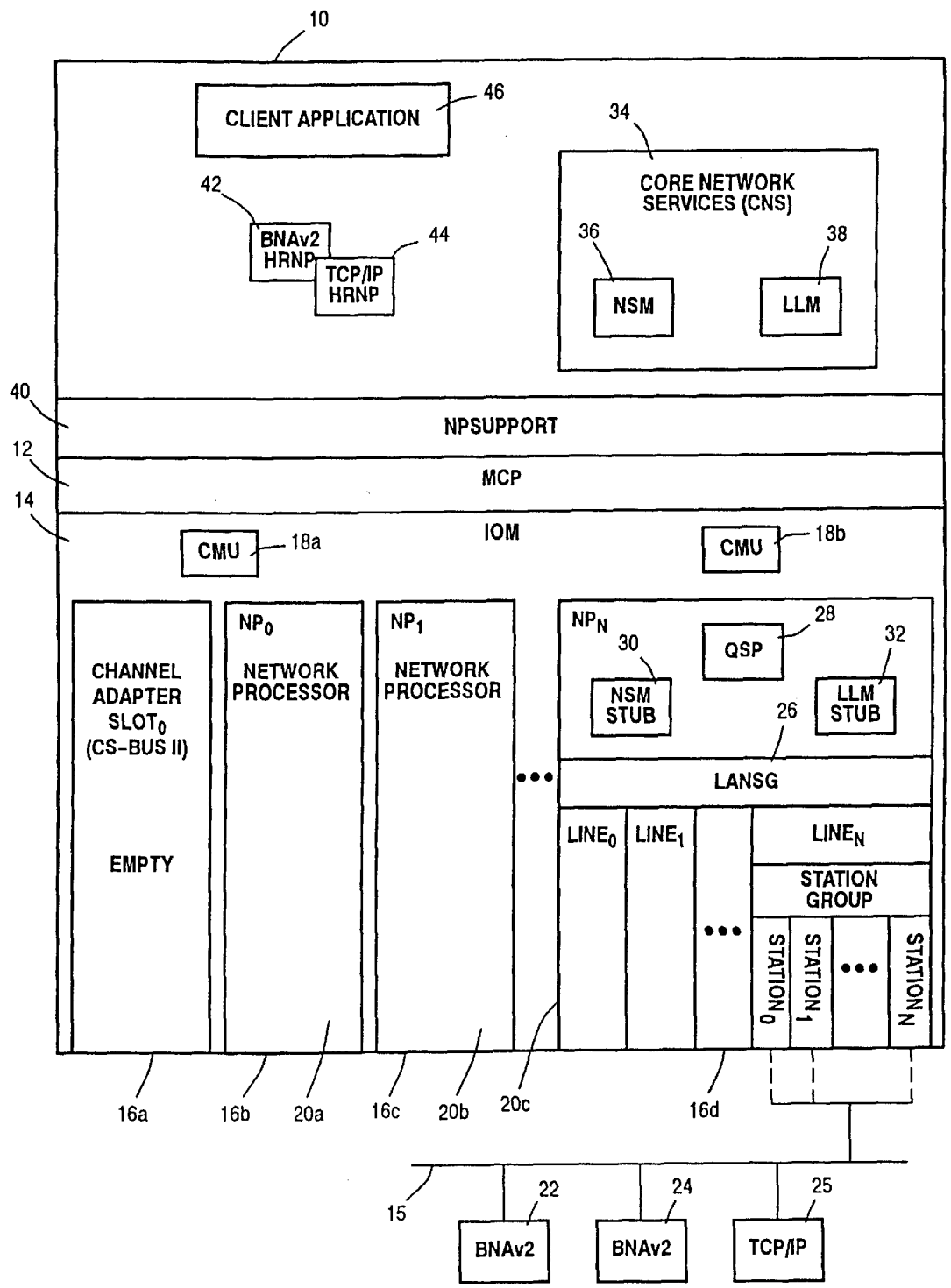
FIG. 1 is a block diagram illustrating the components of a prior art networking architecture employed by Unisys A Series enterprise servers in order to communicate with other hosts, or nodes, on a network.
Figure 2:
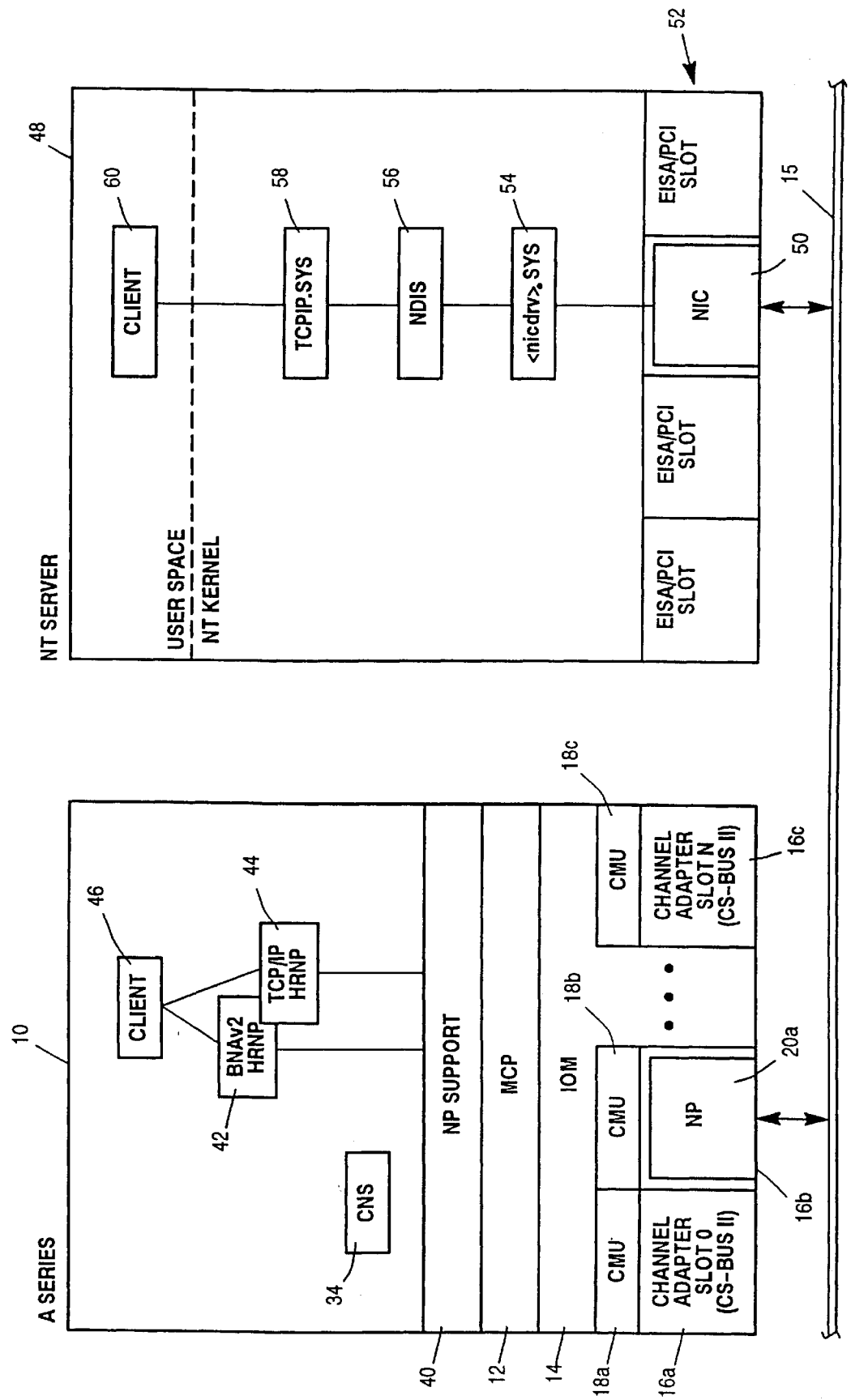
FIG. 2 is a block diagram showing a prior art method by which a Unisys A Series enterprise server can communicate via a network with a server running Microsoft Windows NT.

The present invention is directed to methods and apparatus that enable a first network protocol provider, executing on a first computer system and having a first network address associated therewith, and a second network protocol provider, executing on a second computer system and having a second network address associated therewith, to both send and receive data over a network via a same network interface card installed on the second computer system. In accordance with a preferred embodiment thereof, the present invention comprises an interconnection that couples the input/output (I/O) subsystem of the first computer system to the I/O subsystem of the second computer system and over which data can be transmitted between systems, and a router executing on the second computer system that and a router executing on the second computer system that routes data among the first network protocol provider (via the interconnection), the second network protocol provider, and the network interface card in a manner that enables the network interface card to be shared between the first and second network protocol providers.

In one embodiment, described more fully hereinafter, the methods and apparatus of the present invention may be implemented as part of a Cooperative Networking Platform (CNP) (sometimes also referred to "NX/Network Services" or "NNS") provided as a feature of Unisys ClearPath HMP NX enterprise servers, in which, as mentioned above, a Unisys A Series enterprise server is tightly integrated with an Intel-based server running Microsoft Window NT. In that embodiment, the A Series enterprise server comprises the first computer system and the NT server comprises the second computer system. As embodied in that environment, the present invention allows a network protocol provider (e.g., BNAv2 HRNP or TCP/IP HRNP) on the A Series server to send and receive data over a network via a standard network interface card installed in the NT server. A network protocol provider (e.g., TCPIP.SYS) on the NT server can also access the network via that NIC, and thus, the NIC is shared by both systems. This capability is advantageous because NICs for NT servers are widely available at relatively low cost. The need to develop proprietary NICs (i.e., network processors) for the A Series server, and the significant costs associated therewith, can be avoided.

The methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 3:
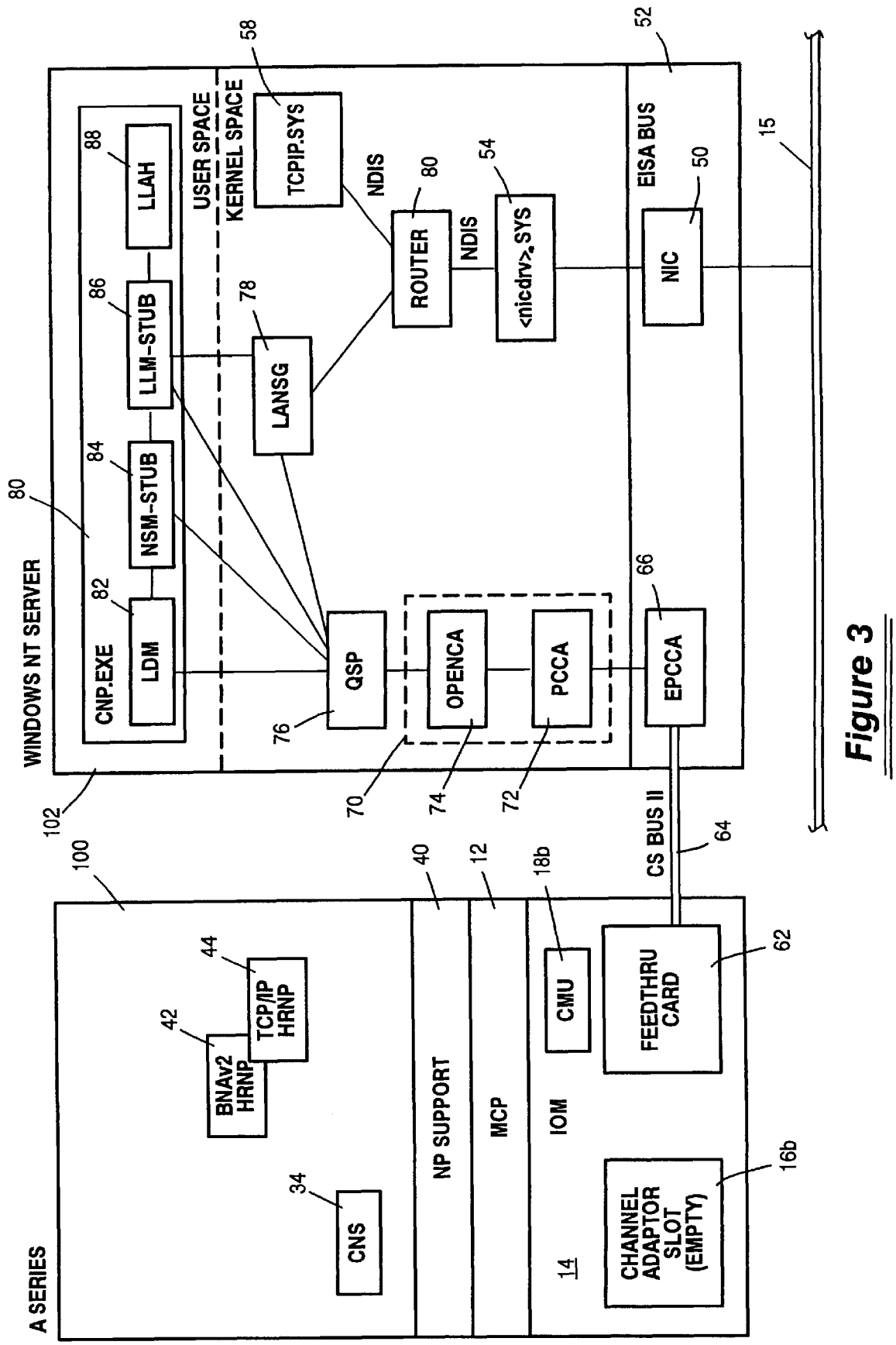
FIG. 3 is a block diagram illustrating one embodiment of apparatus that enables two computer systems to share a single network interface card installed on one of them, in accordance with the present invention.

Referring now to the drawings, wherein like numerals represent like elements throughout, FIG. 3 is a block diagram illustrating one embodiment of the present invention, in which the methods and apparatus of the present invention are implemented as part of a Cooperative Networking Platform (CNP) deployed on a Unisys ClearPath HMP NX computer system ("the ClearPath system"). As shown, the ClearPath system comprises a Unisys A Series enterprise server 100 and an Intel-based server 102 running Windows NT 102 ("the NT server"). In this embodiment, the A Series enterprise server 100 defines a first computer system and the NT server 102 defines a second computer system. A first network protocol provider 44 is provided on the A Series system 100, in this case a TCP/IP HRNP, and it has a network address (i.e., IP address) associated with it. A second network protocol provider 58 is provided on the NT server 102, in this case TCPIP.SYS (available from Microsoft Corporation), and it has its own network address (i.e., IP address) associated with it that defines a second network address in this embodiment. Other network protocol providers may be installed on the A Series and NT servers as well. For example, on the A Series server, a BNAv2 HRNP 42 may be provided. Note, however, that because the BNAv2 protocol is a Unisys proprietary protocol, the BNAv2 HRNP 42 does not have an IP address associated with it. A network interface card (NIC) 50 is installed in a slot of the I/O bus (e.g., EISA or PCI) of the NT server 102. In this embodiment, any LAN-type NIC that is compatible with Windows NT can be employed. Preferably, the NIC supports the Fast-Ethernet networking protocol (e.g., 100Base-T). NICs of this type are available from numerous vendors and original equipment manufacturers (OEMs). NICs supporting other physical media types, such as Ethernet/802.3, FDDI, or Gigabit Ethernet, can alternatively be employed. Typically, a NIC vendor will supply a device driver with the NIC, which is installed in the kernel space of the operating system so that other entities on the system can access the networking functionality of the NIC. The NIC 50 of the exemplary system of FIG. 3 has a device driver 54 ("<nicdrv>.sys") that is installed in the Windows NT kernel space, as shown.

According to the present invention, apparatus and methods are provided that enable both the first and second network protocol providers 44, 58 to access the network 15 via the same NIC 50 installed on the second computer system 102. That is, the present invention enables the NIC 50 to be shared between the two systems 100, 102.

Apparatus of the present invention comprises an interconnection that couples the I/O subsystem of the A Series server 100 to the I/O subsystem of the NT server 102 so that data can be transmitted between the two servers, and a router 80 that executes on the second computer system (i.e., the NT server 102). The router 80 routes data among the first network protocol provider (via the interconnection), the second network protocol provider, and the NIC 50 so that the NIC 50 can be shared by both network protocol providers. More specifically, when data is received from the network 15 by the NIC 50, the router 80 routes the data to the first network protocol provider (e.g., TCP/IP HRNP 44), via the interconnection, when a network address received with the data matches the first network address, but passes the received data to the second network protocol provider (e.g., TCPIP.SYS 58) when the network address received with the data matches the second network address. Data received from the network 15 with a broadcast address is routed to both the first (via the interconnection) and second network protocol providers. Outgoing data from each network protocol provider is routed to the network 15 via that same NIC 50. However, when outgoing data from one of the first and second network protocol providers is addressed to the other network protocol provider, a "loopback" capability enables the router 80 to route that data directly from one network protocol provider to the other, bypassing the NIC 50. Also, outgoing data from one of the first and second network protocol providers that has a broadcast address is routed to the network 15 via the shared NIC 50, and also to the other network protocol provider via the loopback path (bypassing the NIC 50).

The present invention is not limited to use with only one network protocol provider on each system. Rather, the present invention can be used to route data to and from multiple network protocol providers on each system, each network protocol provider having its own network address. Incoming data is routed to the appropriate network protocol provider based on the received network address. Moreover, in the present embodiment, in addition to being able to route data to TCP/IP network protocol providers (e.g., TCP/IP HRNP 44) on the A Series server 100, the router 80 is also capable of routing incoming data addressed to network protocol providers that support the BNAv2 networking protocol (e.g., BNAv2 HRNP 42), as further described hereinafter.

Additional details of the interconnection and of the router 80 are provided hereinafter.

I. The Interconnection

As mentioned above, the interconnection of the apparatus of the present invention couples the I/O subsystem of the A Series server 100 to the I/O subsystem of the NT server 102 to provide a relatively high speed data path between systems. Preferably, the interconnection comprises a physical connection between the I/O subsystems of the first and second computers, and an interconnection device driver 70 that controls access to the physical connection by other software modules on the NT server.

A. One Embodiment

In the embodiment of FIG. 3, the physical connection comprises a feedthrough card 62 installed in a channel adapter slot of the A Series server 100, an EISA Personal Computer Channel Adapter (EPCCA) card 66 installed in an EISA slot of the I/O bus of the NT server 102, and a CS-BUS II cable that connects the CS-BUS II of the A Series system to the EPCCA card 66 via the feedthrough card 62. The interconnection device driver (ICD) 70 is installed in the kernel space of the NT operating system. It controls access to the physical connection (specifically the EPCCA card 66) by other modules on the NT server.

Although not necessary in every embodiment of the present invention, in the embodiment illustrated in FIG. 3, the interconnection further comprises several modules that are analogous to similarly named components in the traditional Unisys networking architecture illustrated in FIG. 1 and described in the background section of this specification. These modules include a Queue Service Provider module 76 that functions analogously to the QSP 28 of FIG. 1, a LANSG module 78 that functions analogously to the LANSG module 26 of FIG. 1, and NSM-stub and LLM stub modules 84, 86 that function analogously to the corresponding components 30, 32 of FIG. 1. In addition, LDM and LLAH modules 82, 88 are provided which function analogously to the similarly named components (not shown) in a traditional Unisys networking architecture. In combination with the physical connection (i.e., feedthrough card 62, cable 64, and EPCCA card 66) and the interconnection device driver 70, these modules simulate a traditional channel adapter-based network processor of the type described above and illustrated in FIG. 1. In this manner, the features and advantages of the present invention are achieved with relatively little modification of the networking components (e.g., CNS 34, NPSUPPORT 40, MCP 12, etc.) on the A Series server 100. With the exception of the LDM 82, NSM-stub 84, LLM-stub 86, and LLAH 88 modules, the main components of the interconnection are implemented as Windows NT kernel-level device drivers to avoid unnecessary data copies that would otherwise occur when transferring data from the NT kernel space to the user space. Each of the foregoing components and modules of the interconnection is described below in more detail.

I. EPCCA Card 66

The EISA Personal Computer Channel Adapter (EPCCA) card 66 plugs into an available EISA bus slot in the NT server 102. The EPCCA card 66 bridges the EISA bus on the NT server 102 to the CS-BUS II of the A Series server 100 via the cable 64 and feedthrough card 62. The feedthrough card 62 plugs into an available channel adapter slot in the IOM 14, providing a direct connection to the data and control lines of the CS-BUS II. Microcode on the EPCCA card 66 emulates an A Series channel adapter.

2. Interconnection Device Driver 70 (PCCA 72 and OPENCA 74)

In the present embodiment, the interconnection device driver 70 comprises a PCCA device driver 72 and an OPENCA device driver 74. The PCCA driver 72 initializes, terminates, configures, and communicates with the EPCCA hardware/microcode 66. The PCCA driver 72 interacts with the OPENCA driver 74 via a procedural interface. This procedural interface passes 32-byte I/O Messages (IOMs) between the EPCCA board 66 and OPENCA 74.

The OPENCA driver 74 acts as an intermediary between PCCA 72 and the rest of the components of the interconnection, as well as providing controller functions for the datapath. It interprets commands received from the A Series server 100 via the PCCA driver 72 and EPCCA card 66, generates results, and sets up memory descriptors for moving data between the NT server 102 and the A Series server 100. OPENCA interfaces with the QSP module 76 via a procedural interface; the IOM-based API used by the PCCA driver 66 is hidden from the QSP 76 and other modules of the interconnection.

3. Queue Service Provider (QSP) 76

The QSP 76 provides a message queuing function that is necessary to interface the NSM and LSM-stubs 84, 86, and the LANSG module 78 to their peers on the A Series server 100 via NPSUPPORT 40. The QSP 76 functions analogously to the QSP 28 in a traditional network processor, as described above and illustrated in FIG. 1. Specifically, the QSP 76 and NPSUPPORT 40 exchange control messages to initialize, establish and terminate pipes, configure, and report errors. They also build and parse headers placed at the beginning of data messages. These headers specify message blocking, message length, and remote queue references (RQRs). As mentioned above, RQRs are used to multiplex many point-to-point dialogs over the lines managed by the LANSG module. Entities on the A Series server 100 that correspond to the stations managed by the LANSG module are assigned unique RQRs, as are the stations to which they correspond. These RQRs are then exchanged out of band via NSM/NSM-Stub and LLM/LLM-Stub control dialogs. Once the RQRs have been exchanged, the originator of a message inserts the other side's RQR in the header, so the receiver can assign that message to the appropriate queue. Thus, the QSP 76 enables multiple dialogs to be multiplexed over the physical connection between the A Series and NT servers.

4. LAN Station Group (LANSG) 78

Like the QSP 76, the LANSG 78 functions analogously to the LANSG 26 in a traditional network processor, as described above and illustrated in FIG. 1. LANSG 78 controls the initialization and termination of station groups on particular lines, as well as the individual stations of each group. It also controls the setting and retrieval of attributes for those groups, the reporting of asynchronous indications, and the passing of data messages thereon. In this embodiment, the LANSG 78 communicates via a STREAMS interface to the QSP 76. STREAMS is an industry standard device driver interface popularized on UNIX systems, but also available for Windows NT systems. In the present embodiment, the STREAMS interface is implemented on the NT server 102 using the Mentat Portable Streams for Windows NT (MPS) product available from Mentat, Inc., 1145 Gayley Ave. Suite 315, Los Angeles, Calif. 90024 USA.

Data from the NT server (e.g., data received from the network 15 via a shared NIC 50) that is destined for a network protocol provider on the A Series server 100 is forwarded to the LANSG 78 and then sent through the QSP 76, the interconnection device driver (ICD) 70, and the physical connection to NPSUPPORT 40 on the A Series server 100. In the present embodiment, the LANSG module 78 manages physical lines in a manner similar to the LANSG module 26 of a traditional Unisys network processor. In this embodiment, however, the lines that the LANSG module 78 manages are implemented by network interface cards installed in the NT server 102. For example, the shared NIC 50 installed in the NT server 102 defines one line managed by the LANSG module 78. More than one shared NIC 50 can be installed in the NT server 102, each defining a different line of the Unisys networking architecture. Moreover, as described in co-pending application Ser. No. 09/088,552, entitled "A Virtual Lan Interface For High-Speed Communications Between Heterogeneous Computer Systems," a simulated FDDI local area network within the memory space of the NT server defines another line within the LANSG module 78. As described in the co-pending application, the simulated FDDI network, in combination with the interconnection described herein, provides another connectivity solution between the TCP/IP network protocol providers 44, 58 on each server. In the present embodiment, the simulated FDDI local area network is always defined as Line0.

The LANSG module 78 maintains a mapping of line numbers to AdapterNames. Line numbers are assigned to station groups by configuration commands entered on the A Series server 100. The LLM communicates these line numbers to the LLM-stub 86. AdapterNames are assigned by Windows NT as NICs are configured into the NT server 102 and stored in the Windows NT Registry. LANSG 78 will obtain the AdapterNames of those NICs that are bound to LANSG 78 in the Registry and will maintain a mapping to the associated line number and other information. The following table illustrates the information maintained for each line number in use:

| Line Number | Adapter Name | Adapter Handle | Media |
|---|---|---|---|
| 0 | always simulated FDDI LAN | obtained from call to NdisOpenAdapter | always FDDI |
| 1 | obtained from the registry | obtained from call to NdisOpenAdapter | Ethernet |
| 2 | " | obtained from call to NdisOpenAdapter | " |
| 3 | " | obtained from call to NdisOpenAdapter | " |
| 4 | " | obtained from call to NdisOpenAdapter | " |
| 5 | " | obtained from call to NdisOpenAdapter | " |
| 6 | " | obtained from call to NdisOpenAdapter | " |
| 7 | " | obtained from call to NdisOpenAdapter | " |

-continued

| Line Number | Adapter Name | Adapter Handle | Media |
|---|---|---|---|
| 8 | " | obtained from call to NdisOpenAdapter | " |
| 9 | " | obtained from call to NdisOpenAdapter | " |
| 10 | " | obtained from call to NdisOpenAdapter | " |
| 11 | " | obtained from call to NdisOpenAdapter | " |
| 12 | " | obtained from call to NdisOpenAdapter | " |
| 13 | " | obtained from call to NdisOpenAdapter | " |
| 14 | " | obtained from call to NdisOpenAdapter | " |
| 15 | " | obtained from call to NdisOpenAdapter | " |

5. Load/Dump Module (LDM) 82

The LDM 82 provides a mechanism for simulating a load of a network processor firmware file (a process that is performed during initialization of traditional network processors) to the CNP platform on the NT server 102 and for initiating a CNP state dump. The LDM resides inside an executable file, CNP.EXE, that is initiated as an NT service when the NT server 102 boots up. As part of the simulated firmware loading, the LDM 82 initiates the NSM-stub process 84, which in turn initiates the LLM-stub process 86, and initiates the QSP 76.

6. Network Services Module Stub (NSM-Stub) 84

The NSM-stub module 84 is also part of the CNP.EXE executable and is responsible for carrying out commands/responses sent to it by the NSM 36 (a component of CNS 34) on the A Series server 100. Essentially, it performs the functions of the NSM-stub 30 of a typical Unisys network processor. In the present embodiment, the NSM-Stub 84 interfaces with the QSP module 76 via a STREAMS interface using standard STREAMS calls (i.e., open, close, ioctl, putmsg, getmsg).

7. Link Layer Manager Stub (LLM-Stub) 86

The LLM-stub module 86, also part of CNP.EXE, is responsible for carrying out commands/responses sent to it by the LLM 38 (a component of CNS 34) on the A Series server 100. Essentially, it performs the functions of the LLM-stub 32 of a typical Unisys network processor. In the present embodiment, the LLM-Stub 86 likewise interfaces with the QSP module 76 via a STREAMS interface using standard STREAMS calls (i.e., open, close, ioctl, putmsg, getmsg).

8. Link Layer Attribute Handler (LLAH) 88

The LLAH module 88, another module within CNP.EXE, functions similarly to its counterpart in a traditional Unisys network processor. Specifically, the LLAH module 88 is responsible for performing the detailed processing associated with parsing, validating, and building attribute lists. The LLAH enforces attribute range validity rules and checks for inter-attribute consistency. The LLM-Stub 86 is the only module that interfaces with the LLAH.

B. Host Interface Function (HIF)—Alternative Embodiments

Still referring to FIG. 3, the interconnection device driver 70, including its PCCA and OPENCA drivers 72, 74 in the present embodiment, and the physical connection formed by the feedthrough card 62, cable 64, and EPCCA card 66, together define a Host Interface Function (HIF). According to another feature of the present invention, the procedural interface between the QSP 76 and the interconnection device driver 70 of the HIF is designed to isolate the QSP 76 from the HIF. This enables the present invention to be employed with different implementations of the HIF. Specifically, the procedural interface between the QSP 76 and the interconnection device driver 70 is established through a process by which each module publishes entry points (i.e., pointers) to the procedures that implement its functionality, along with any required variable values. Another device driver entity called NNSDRLOG.SYS (not shown) maintains a record of these entry points.

The interconnection device driver 70 of the HIF registers the following entry points and attributes:

HifSendBlockToHost( )—a function called by QSP to deliver a block of data to the MCP;

HifOpenUnit( )—a function called by QSP to initialize one of several pipes (units) through which data received from the LANSG module 78 can be transmitted to the appropriate entity on the A Series server 100;.

HifCloseUnit( )—a function called by QSP to indicate that one of the pipes (units) is terminated;

maxQueuesSupported—a variable initialized by the HIF which QSP can reference to determine how many pipes (queues/units) it can use to send messages to the MCP 12 of the A Series server 100; and platform—a variable initialized by the HIF which identifies (via an enumeration) a particular implementation of the HIF (two alternate HIF implementations are described below and illustrated in FIGS. 4 and 5, respectively). In the present embodiment, these functions and variables are implemented by the OPENCA driver 74 of the interconnection device driver 70.

Likewise, the QSP 78 registers the following entry points:

QspAckBlockToHost( )—a function called by the ICD to indicate to the QSP 78 that a particular block of messages has been successfully delivered to the MCP 12;

QspReset( )—a function called by the ICD to indicate to the QSP 78 that communications with the MCP 12 via the interconnection have been lost, and that pending messages should be flushed; and QspLRPut( )—a function called by the ICD to deliver a block of data from the A Series server to the QSP 78.

In order to invoke one of these functions, a call is made to the registered entry point for that function. As a result of this indirection, different interconnection device drivers can be installed for different implementations of the HIF in a manner that is completely transparent to the QSP 76.

Figure 4:
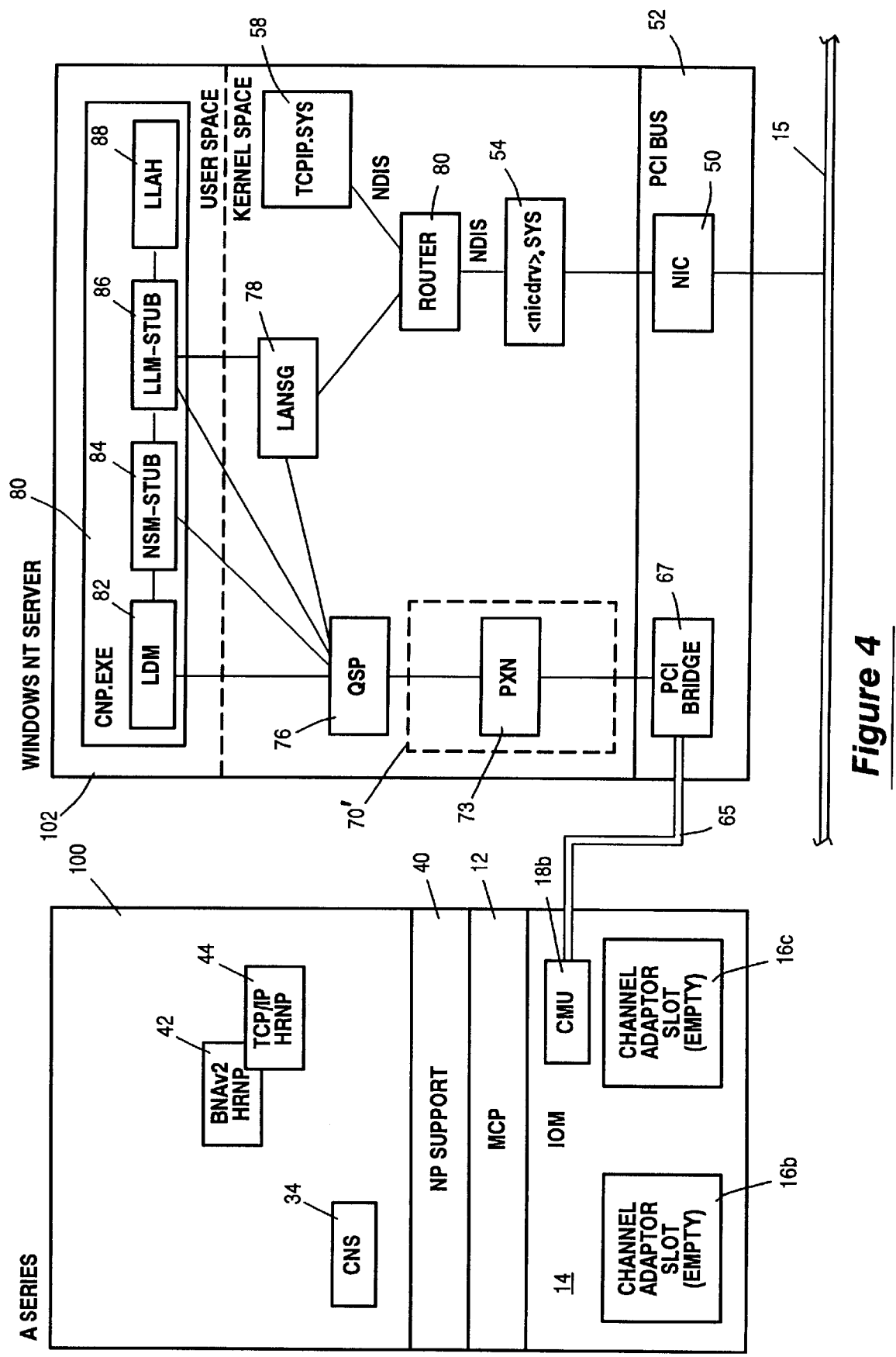
FIG. 4 is a block diagram illustrating an alternative embodiment of an interconnection of the apparatus of FIG. 3.
Figure 5:
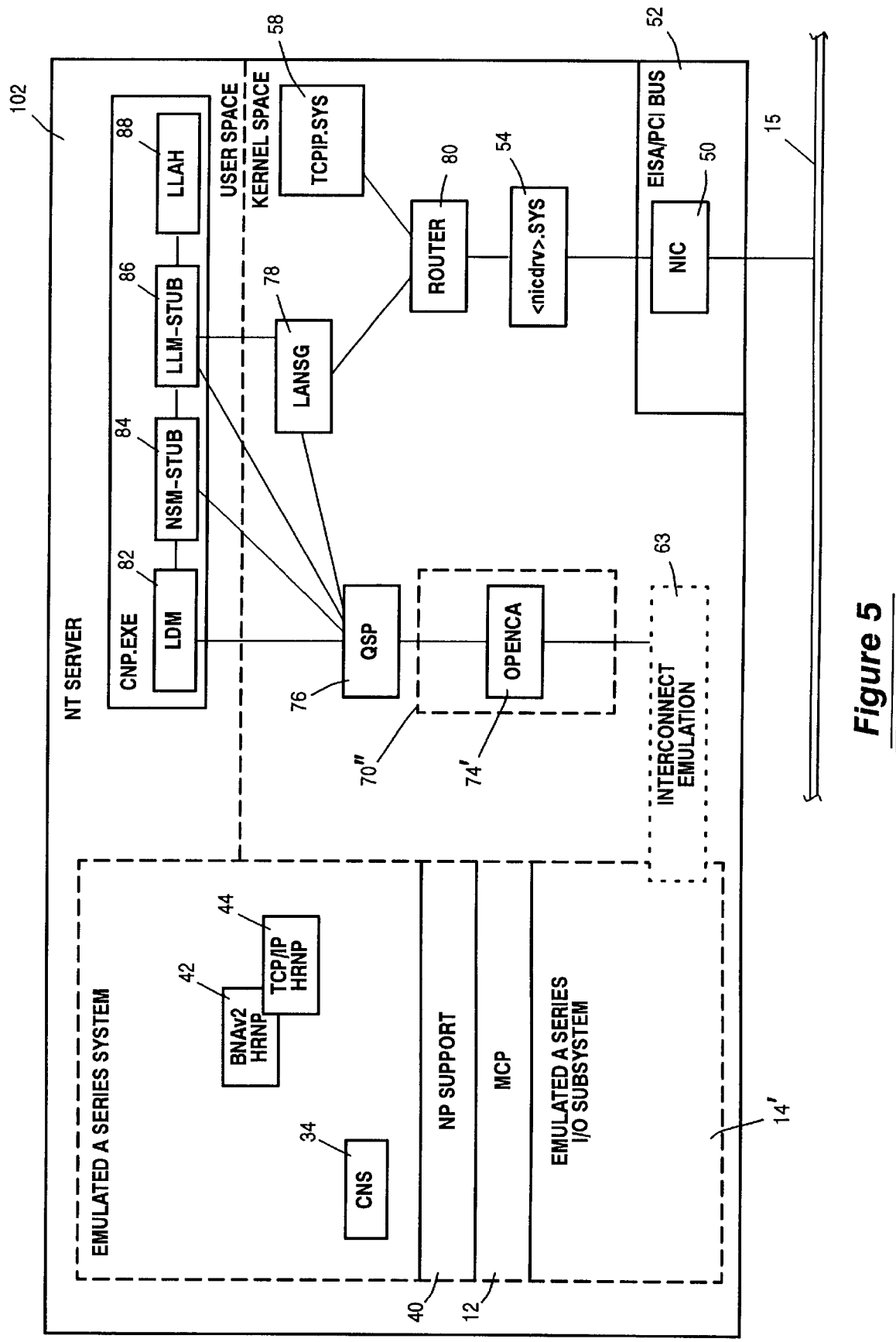
FIG. 5 is a block diagram illustrating yet another embodiment of the interconnection of the apparatus of FIG. 3.

FIGS. 4 and 5 illustrate two alternate embodiments of the HIF, which illustrate the modularity provided by the procedural interface design described above. In FIG. 4, the physical connection (i.e., the feedthrough card 62, cable 64, and EPCCA card 66) is replaced by a PCI Bridge card 67 that connects via a cable 65 directly to a port on one of the CMUs 18b of the IOM 14 of the A Series server 100. By connecting directly to the CMU, some of the latency inherent in the CS-Bus II protocol is avoided. This provides a more direct, higher speed connection between the I/O subsystems of the two servers 100, 102. Because the physical connection is changed, a modified interconnection device driver 70' is provided. The modified interconnection device driver 70' comprises a single device driver module, PXN 73, that provides the interface between the QSP 76 and the hardware on the PCI Bridge card 67. However, the procedural interface, and the mechanism by which the QSP 76 and interconnection device driver 70' register entry points to the respective procedures of that interface is unchanged. Accordingly, the changes to the HIF are transparent to the QSP 76 and the other modules of the present invention that comprise the Cooperative Networking Platform (CNP).

FIG. 5 is an embodiment in which the A Series system is emulated through software in the NT server 102. Unisys provides such an emulated system in its ClearPath HMP NX 4200 series enterprise servers. In this embodiment, the physical connection is emulated such that it becomes a memory-to-memory connection 63 between the memory space of the emulated I/O subsystem 14' and the memory space of the NT system. The emulated connection 63 functions in a manner similar to the feedthrough card 62, cable 64, EPPCA card 66, and PCCA 72 components of the hardware implementation of FIG. 3. The interconnection device driver 70" in this embodiment comprises a modified form 74' of the OPENCA module 74 of the implementation of FIG. 3. Again, however, the procedural interface between the modified OPENCA module 74' and the QSP 76 is not changed, so that the emulated A Series server and its emulated connection 63 to the NT server is transparent to the QSP 76 and the other modules of the present invention that comprise the Cooperative Networking Platform (CNP).

C. Operation

FIGS. 6A–6F provide further details of how data is transferred between the A Series server 100 and the NT server 102 via the interconnection device driver of the HIF and the QSP module 76. The details provided in FIGS. 6A–6E are applicable to any of the three embodiments of the HIF shown in FIGS. 3, 4, and 5. Thus, as used in the following discussion, the term interconnection device driver (ICD) refers to any of the three interconnection device driver embodiments described above.

The QSP 76 multiplexes multiple client dialogs (e.g., dialogs with the NSM-stub and LLM-stub modules 84, 86 and with the different stations defined by LANSG 78) over one or more transfer units. Units are an abstraction of the communication paths supported by the interconnection device driver (ICD). Units may be logical dialogs or physical devices. In order to more fully utilize the unit resources, the QSP 76 may aggregate messages waiting for transfer over a same unit into a block that can be transferred in a single operation. The QSP 76 supports such blocking by providing a Message-Count field in its message headers. The first message header in a block contains the number of messages that the block contains in its Message-Count field. Subsequent message headers within the block have a zero value in that field.

The ICD then takes each block and programs the physical connection (i.e., the EPPCA board 66, the PCI Bridge card 67, or the emulated memory-to-memory connection 63, depending upon the implementation) to transfer the block to the A Series server. In the reverse direction, the ICD is awakened when a message is transferred via the physical connection into the memory of the NT server 102, either by an interrupt (in the case of the hardware connections of FIGS. 3 and 4) or by a function call (in the case of the emulated connection 63 of FIG. 5). The ICD delivers the received message to the QSP 76, which in turn, distributes it to the appropriate client dialog (e.g., NSM-stub 84, LLM-stub 86, or a given station defined by LANSG 78), based on the RQR associated with the message.

Figure 6A:
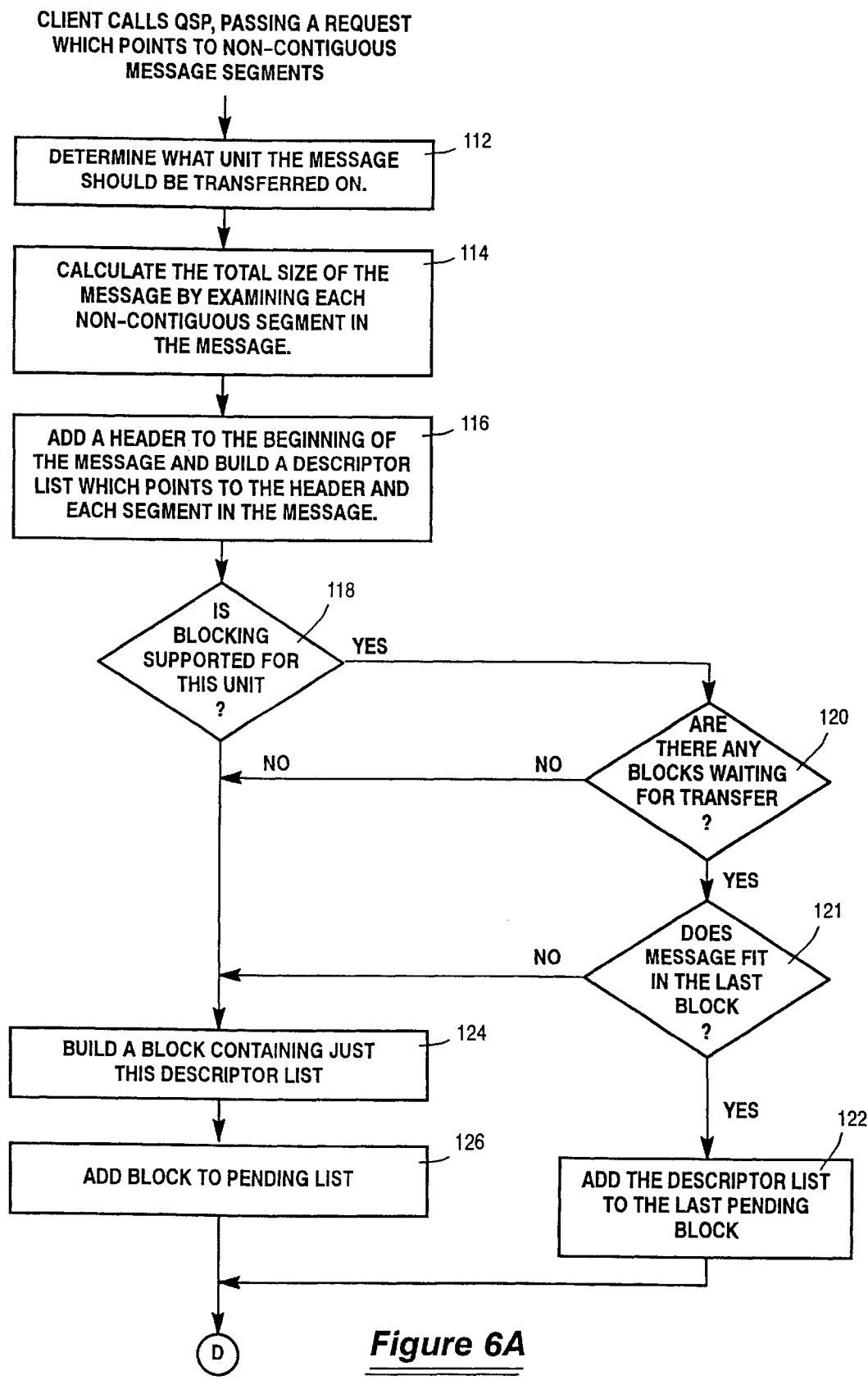
Figure 6B:
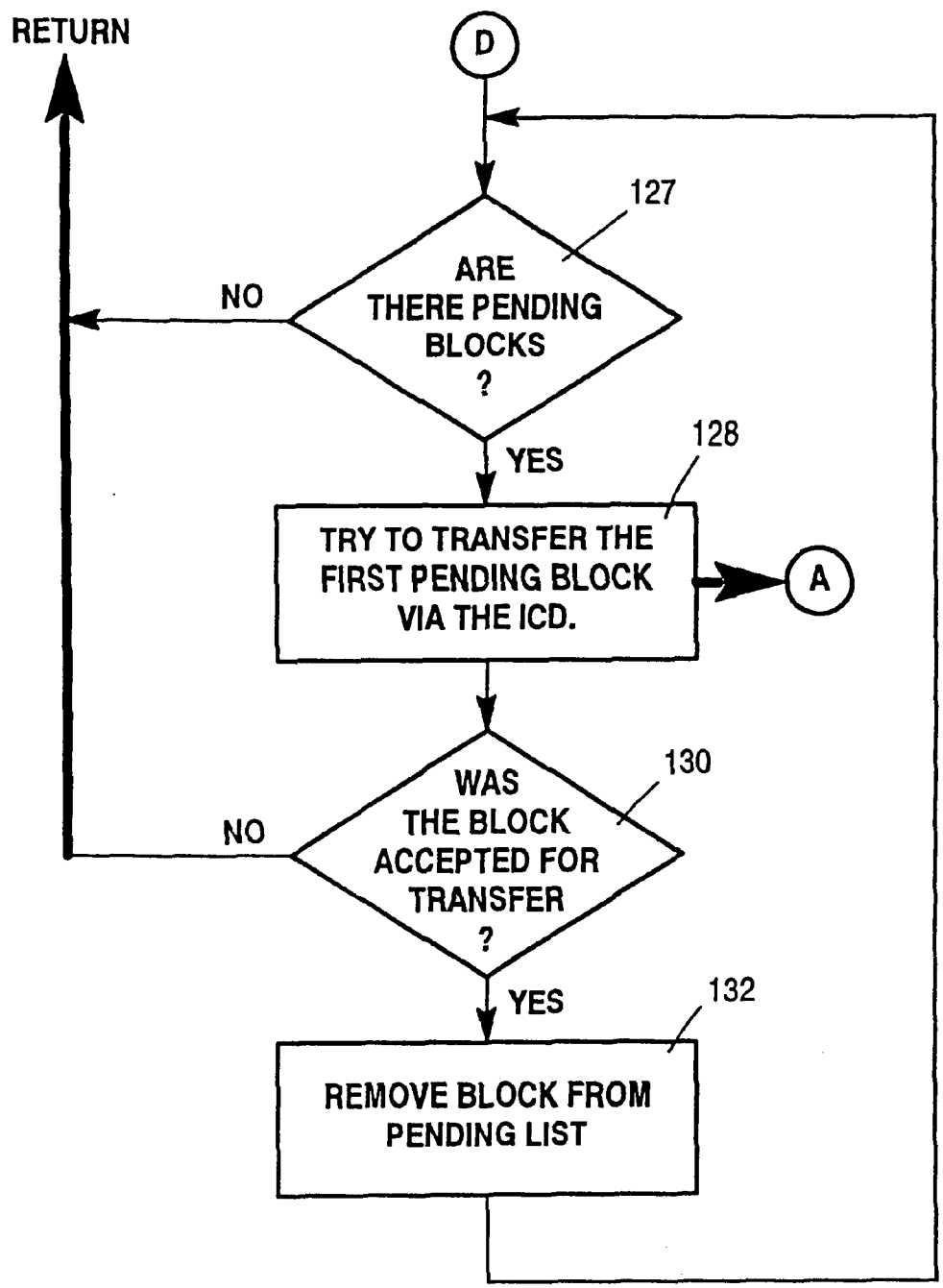

FIGS. 6A–6D provide further information concerning the steps performed by the QSP 76 and ICD in transferring messages from a client on the NT server 102 (e.g., NSM-stub 84, LLM-stub 86, or a station defined by LANSG 78) to the A Series server 100 via the physical connection. This transfer process begins when a client, for example, the LANSG module 78, which may need to pass data received from the NIC 50 to the A Series server 100, calls the QSP 76 requesting that a message (e.g., the data received from the network) be transferred to the A Series server 100. A parameter is passed with the request that points to non-contiguous message segments that comprise the full message. At step 112, the QSP 76 determines on what unit the message should be transferred. Next, at step 114, the QSP 76 calculates the total size of the message by examining each non-contiguous segment in the message. At step 116, a header is added to the beginning of the message, and a descriptor list is built that points to the header and to each segment in the message. Next, at step 118, the QSP 76 determines whether blocking (described above) is supported for this unit. If so, at step 120, the QSP 76 determines whether any blocks are presently waiting for transfer. If so, at step 121, the QSP 76 determines whether the message will fit in the last pending block. If so, then at step 122, the QSP 76 adds the descriptor list to the last pending block. Control then passes to step 127 (FIG. 6B).

If in step 118, blocking is not supported for this unit, or if in step 120 it is determined that there are no blocks presently waiting for transfer, or if in step 121 it is determined that the message will not fit in the last pending block, then control passes in all three cases to step 124. At step 124, the QSP 76 builds a block containing only the descriptor list built in step 116. Next, at step 126, the newly created block is added to the list of pending blocks. Control then passes to step 127 (FIG. 6B).

Referring now to FIG. 6B, at step 127, the QSP 76 determines whether any blocks are pending. If not, the QSP 76 simply returns to the client. If however, there are pending blocks to be transferred, then control passes to step 128.

Figure 6C:
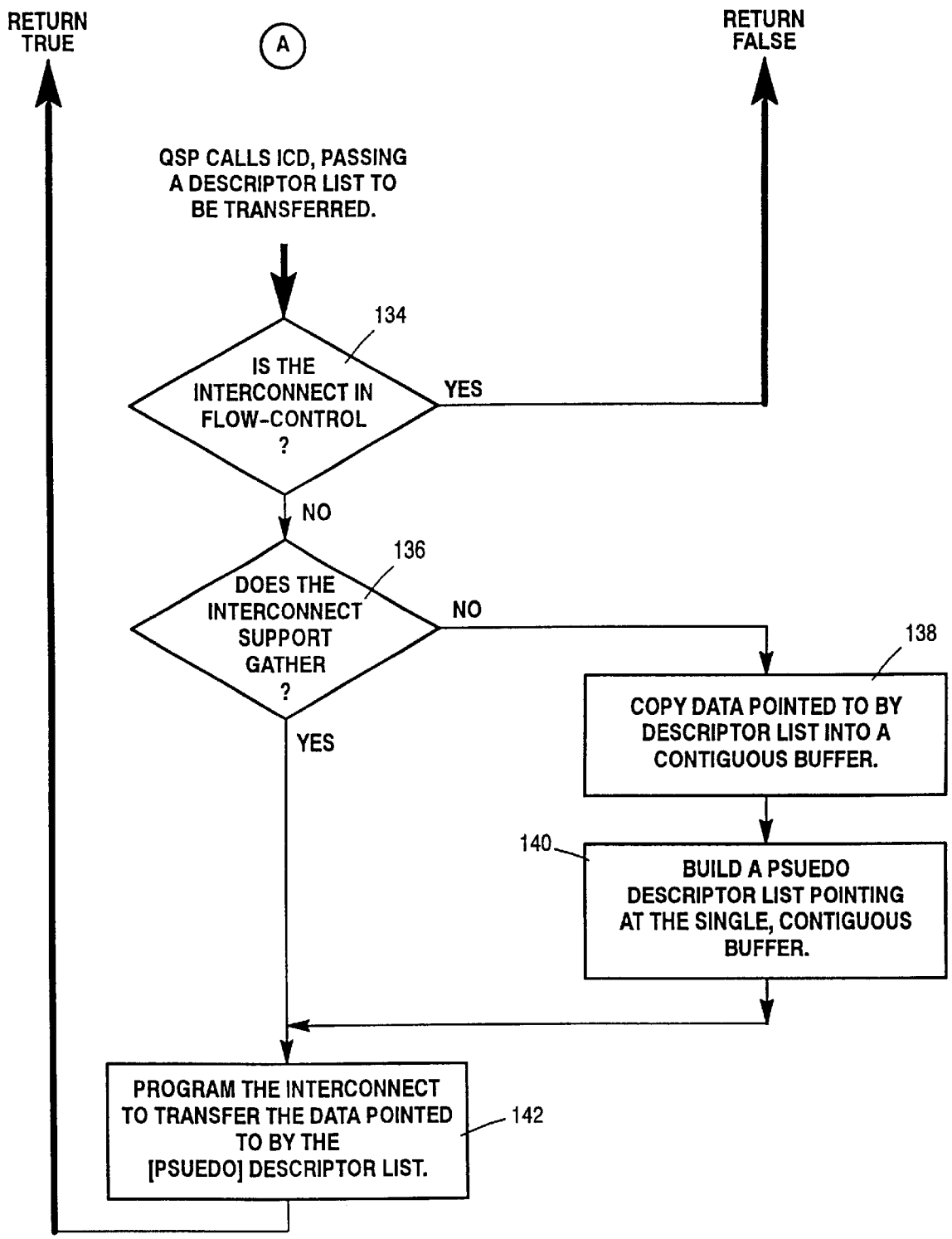

At step 128, the QSP 76 attempts to send the first block in the list of pending blocks to the ICD by invoking the HifSendBlockToHost( ) procedure of the ICD. As indicated by the arrow labeled "A", the ICD begins processing the request at that point. The steps performed by the ICD are illustrated in FIG. 6C. Still referring to FIG. 6B, however, the QSP's processing continues to step 130, where the QSP 76 determines whether the ICD accepted the block for transfer. If so, that block is removed from the pending list at step 132, and control loops back to step 127 where the QSP 76 again checks whether there are any pending blocks to be transferred and processing continues for any such subsequent blocks. If, however, in step 130 it is determined that the ICD did not accept a given block for transfer, then the QSP 76 returns to the client, leaving the block containing the message to be sent on the pending list.

Referring now to FIG. 6C, the ICD begins processing the HifSendBlockToHost( ) request from the QSP at step 134, where it determines whether the physical connection is in flow-control mode. Flow-control mode is a mode in which the MCP operating system of the A Series server 100 is not prepared to receive data on the specific unit, for example, because no buffer is available. If the physical connection is in flow-control mode, the ICD returns a value of "FALSE" to the QSP 76 and stops processing the transfer at this point. If the physical connection is not in flow-control mode, then control passes to step 136 where the ICD determines whether the physical connection supports a Gather function. Gather is the ability to transfer data from non-contiguous memory regions in one operation. If the physical connection does not support a Gather capability, control passes to step 138 where the ICD copies the data pointed to by the descriptor list (passed to it by the QSP 76) into a contiguous buffer. Next, at step 140, the ICD builds a pseudo descriptor list that points at the single, contiguous buffer. Control then passes to step 142.

At step 142, whether entered directly from step 136 (Gather supported) or from step 140 (Gather not supported), the ICD programs the physical connection (i.e., the EPCCA board 66, the PCI Bridge card 67, or the emulated memory-to-memory connection 63 depending upon the particular embodiment) to transfer the data pointed to either by the descriptor list received from the QSP 76 (Gather) or the pseudo descriptor list created in step 140 (no Gather). The ICD then returns a value of "TRUE" to the QSP 76.

FIG. 6D illustrates the steps performed by the ICD and QSP 76 when the transfer completes. As shown, when the transfer completes, the ICD is awakened. At step 144, the ICD receives an indication of whether the transfer completed successfully. If not, control passes to step 146 where the ICD attempts to recover from the error by, for example, retransferring the block in question, resetting the physical connection, etc. If the transfer completed successfully, control passes to step 148. At step 148, the ICD adjusts the flow-control state of the physical connection. This is done because in the embodiments of the physical connection described above, the interconnection is polled. When a transfer completes, the interconnection may not be able to initiate another transfer until it is polled again, so the flow-control state is adjusted to reflect this. Next at step 150, the ICD calls the QspAckBlockToHost( ) procedure to notify the QSP that the transfer is complete and to indicate which descriptor list was transferred. At step 152, the ICD performs a cleanup procedure and then returns.

As shown at point "B", when the QSP 76 receives the QspAckBlockToHost( ) indication from the ICD, notifying it that the transfer completed successfully, the QSP 76 enters step 154 where all messages in the transferred block are released, causing the clients that sent them to be notified that they were successfully transferred. At step 156, the block structures, including the message headers and descriptor list, are recycled and made available for subsequent transfers. Control then loops back to step 127 of FIG. 6B for processing of subsequent blocks.

Figure 6E:
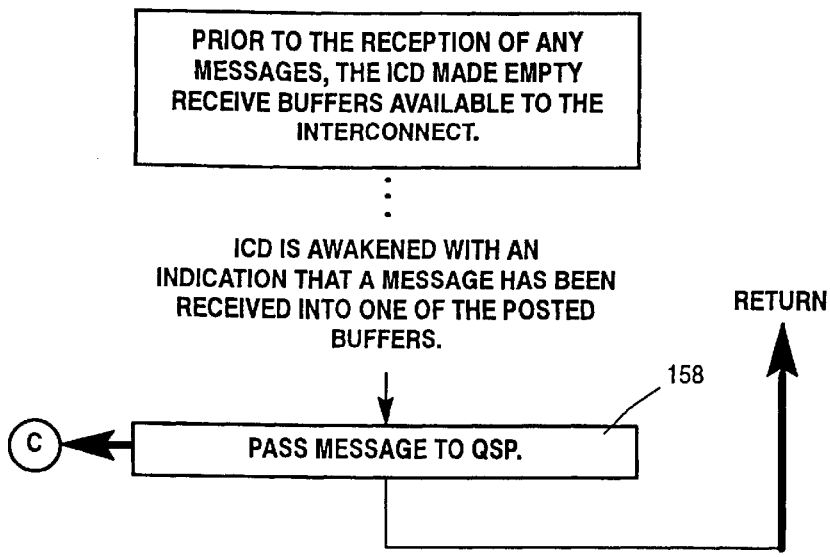
Figure 6F:
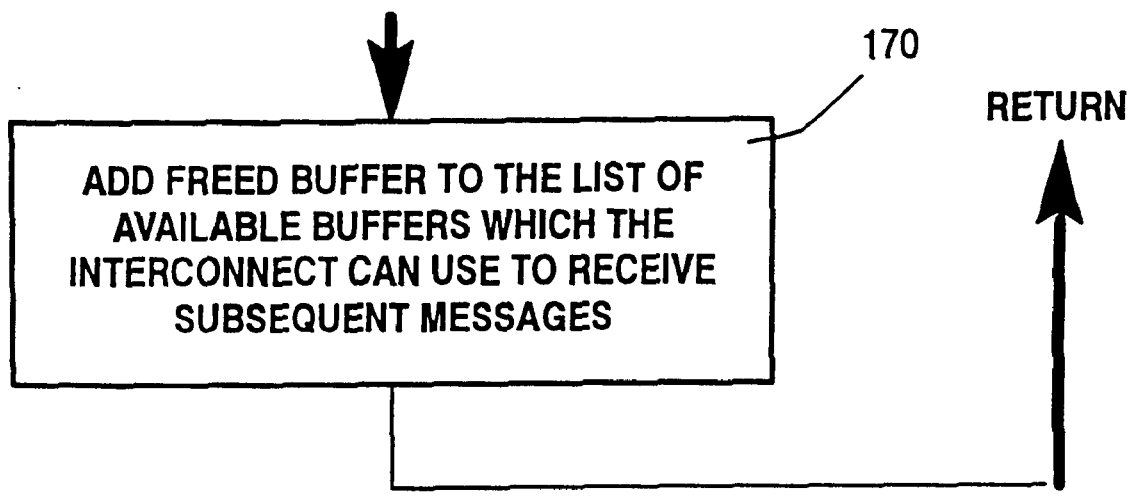

FIGS. 6E–6F illustrate the steps performed by the ICD and QSP 76 in transmitting a message from the A Series server 100 to the NT server 102. As shown, prior to the reception of any messages from the A Series server via the physical connection, the ICD makes empty receive buffers available to the connection. When a message is transferred from the A Series server 100 to the NT server via the physical connection (e.g., through the feedthrough card 62, across cable 64, and through the EPCCA card 66 in the embodiment of FIG. 3), the ICD is awakened with an indication that a message has been received into one of the empty receive buffers that it posted. At step 158, the ICD passes the message to the QSP 76 using the QspLRPut( ) function and returns.

At step 160, the QSP 76 determines whether the message is a control message. If so, at step 164, the QSP 76 processes the control message locally, and then releases the message at step 166 and returns. If the message is not a control message, then control passes to step 162. At step 162, the QSP 76 determines from the RQR in the message header which station is to receive the message. Next, at step 168, the message is passed to the appropriate station.

Referring now to FIG. 6F, when the QSP 76 or one of its clients releases the message buffer, a free message callback function of the ICD is invoked. At step 170, the ICD adds the freed buffer to the list of available buffers which the physical connection can then use to receive subsequent messages in the manner described above.

II. The Router 80

Referring again to FIG. 3 for purposes of illustration, as mentioned above, the router 80 routes data among a first network protocol provider (e.g., BNAv2 HRNP 42 or TCP/IP HRNP 44) on a first computer system (via the interconnection), a second network protocol provider (e.g., TCPIP.SYS 58) on a second computer system, and a NIC 50 on the second computer system, so that the NIC 50 can be shared by both network protocol providers.

Figure 7:
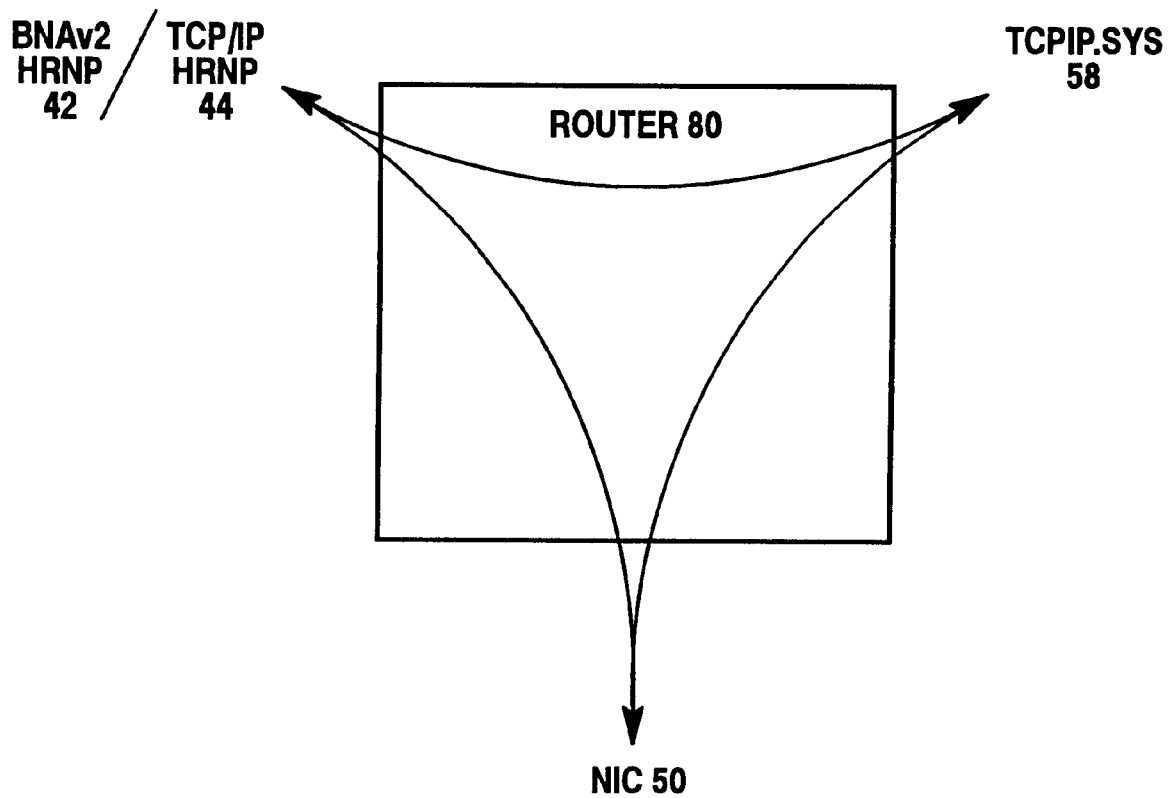
FIG. 7 is a diagram illustrating the different data paths over which the router of the present invention may route incoming and outgoing network data.

FIG. 7 illustrates the various data paths that the router 80 provides in accordance with a preferred embodiment of the present invention. When data is received from the network 15 by the NIC 50, the router 80 routes the data to the first network protocol provider (e.g., TCP/IP HRNP 44 or BNAv2 HRNP 42), via the interconnection, when a network address received with the data matches the first network address, as illustrated by path 174. When the received data has an address that matches that of the second network protocol provider (e.g., TCPIP.SYS 58), the data is routed to that network protocol provider, as illustrated by path 172. Data received from the network 15 with a broadcast address is routed to both the first (via the interconnection) and second network protocol providers, via paths 172 and 174. Outgoing data from each network protocol provider is routed to the NIC 50 via the respective paths 172, 174. However, when outgoing data from one of the first and second network protocol providers is addressed to the other network protocol provider, a "loopback" capability enables the router 80 to route that data directly from one network protocol provider to the other, bypassing the NIC 50, as illustrated by path 176. Also, outgoing data from one of the first and second network protocol providers that has a broadcast address is routed to the shared NIC 50 via the respective path 172 or 174, and also to the other network protocol provider via the loopback path 176, bypassing the NIC 50. In the present embodiment, the "loopback" path 176 is only implemented for TCP/IP-to-TCP/IP transfers.

As also illustrated in FIGS. 3 and 7, the present invention is not limited to use with only one network protocol provider on each system. Rather, the present invention can be used to route data to and from multiple network protocol providers on each system, each network protocol provider having its own network address. Moreover, in the present embodiment, network protocol providers on the A Series server 100 may include both TCP/IP network protocol providers (e.g., TCP/IP HRNP 44) and BNAv2 network protocol providers (e.g., BNAv2 HRNP 42). In this embodiment, the router 80 distinguishes between BNAv2 frames and TCP/IP frames according to the method described in commonly assigned, U.S. Pat. No. 5,379,296, entitled "Method and Apparatus for Interfacing a Workstation to a Plurality of Computer Platforms" (Johnson et al.), which is hereby incorporated by reference in its entirety.

Figure 8:
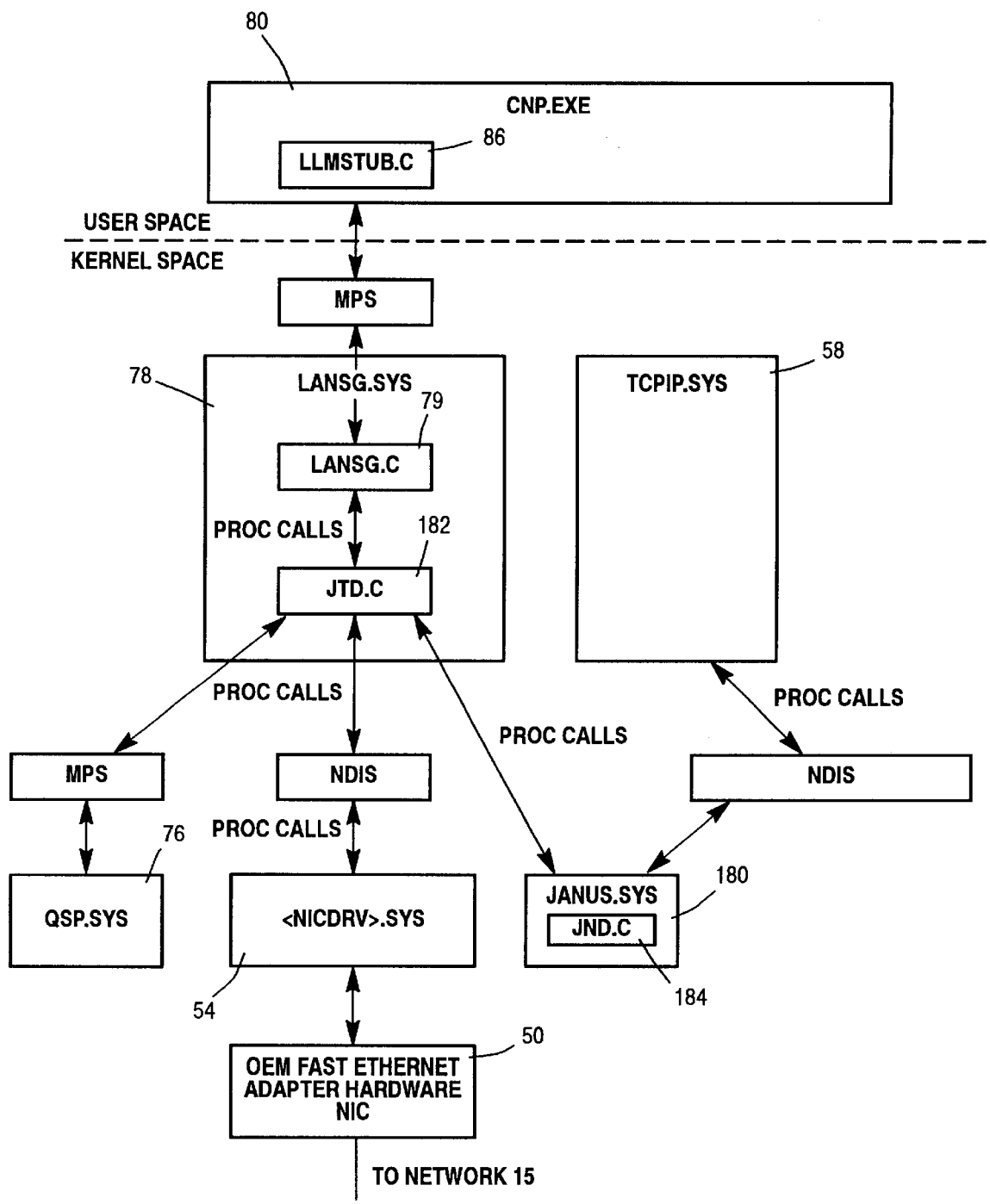
FIG. 8 is a block diagram illustrating further details of an implementation of the router of the present invention, in accordance with a preferred embodiment.

FIG. 8 is a block diagram illustrating further details of the implementation of the router 80 in accordance with the preferred embodiment. In this embodiment, the LANSG 78, QSP 76 are both implemented as kernel-level device drivers within the kernel space of the NT operating system. The interface between LANSG 78 and QSP 76 is a STREAMS interface implemented using the Mentat Portable Streams (MPS) for Windows NT run-time environment. In this embodiment, the functionality of the router 80 is implemented in two components, a transport driver component (JTD) 182 and a NIC driver component (JND) 184. The JND component 184 is implemented in the form of an NDIS Miniport NIC driver, referred to herein as JANUS .SYS. "Janus" is a reference from Roman mythology to the ancient god of gates and doorways, depicted with two faces looking in opposite directions. The JTD component is implemented as a module (JTD.C) that is separately compiled from the LANSG.C module (which contains the LANSG functionality), but linked as part of LANSG.SYS.

The JTD component 182 of the router 80 maintains an adapter table with the state of each NIC for which it is responsible, including the IP addresses of the network protocol providers on the A Series and NT servers 100, 102 to which it may have to route incoming data in accordance with the present invention. The following is a C-language structure definition of the adapter table:

```
typedef struct {
    NDIS_STRING    adapter_name;
    NDIS_HANDLE    jtd_adapter_handle;    // returned from NdisOpenAdapter
    NDIS_HANDLE    jnd_adapter_handle;    // JND's Adapter Handle
    UINT           medium;                // returned from NdisOpenAdapter
    NDIS HANDLE    packet_pool_handle;    // returned from NdisAllocatePacketPool
    NDIS HANDLE    buffer_pool_handle;    // returned from NdisAllocateBufferPool
    U32            mcp_ip_addr;           // A Series IP address for this adapter
    U32            nt_ip_addr;            // NT server IP address for this adapter
    sg_tab_t       *sg_tab_p;             // ptr to stn group assoc. w/ this
                                          adapter
} jtd_adapter_info_t;
jtd_adapter_info_t adapter_table[MAX_ADAPTERS_SUPPORTED];
```

The "adapter_name" field of the structure contains the AdapterName assigned to the particular shared NIC (e.g., NIC 50) that the entry represents. The "jtd_adapter_handle" and "medium" fields contain values returned by the NdisOpenAdapter function of the NDIS specification. The "packet_pool_handle" and "buffer_pool_handle" fields contain values returned by the NdisAllocatePacketPool and NdisAllocateBufferPool functions of the NDIS specification. The "jnd_adapter handle" field contains a value that is obtained from the JND component 184. This value represents the unique handle used by JND to identify the adapter. The "mcp_ip_addr" field contains the IP address of the network protocol provider (e.g., TCP/IP HRNP 44) on the A Series server that shares this particular NIC, and the "nt_ip_addr" field contains the IP address of the network protocol provider (e.g., TCPIP.SYS 58) on the NT server 102 that shares this NIC. Alternatively, other embodiments may support multiple IP addresses on a single adapter line, for a given network protocol provider.

Even though JTD.C is linked with LANSG.C into LANSG.SYS and could store this info in the station group table of LANSG, a separate (but linked) adapter table is chosen in this design to isolate the NDIS interface in JTD.C and to minimize the size of the station group table (a "mask" of station group table size is used in the interface from the LLM-Stub and LANSG.C for setting station group attributes). The adapter table is linked to the station group table of LANSG 78 by the following additional entry in the station group table which points to a given entry of the adapter table:

```
typedef struct {
    ...
    jtd_adapter_info_t *adapter_info_p;
    ...
} sg_table_t;
```

The JTD component 182 obtains the IP addresses of the TCP/IP network protocol providers on each server 100, 102 to which it may have to route incoming data as follows. On the NT server 102, when TCPIP.SYS 58 is configured to use an IP address on a particular NIC (e.g., NIC 50), it stores an entry containing that IP address in the Windows NT Registry at the following location:

HKEY_LOCAL_
  MACHINE\SYSTEM\CurrentControlSet\Services\<Adapter
  Name>\Parameters\TCPIP.

The JTD component 182 has access to this location in the Registry for all of the NICs that are configured to be "shared" and will store the IP addresses retrieved from the Registry for each shared NIC in its local tables.

On the A Series server 102, IP addresses are configured using the NW TCPIP TCPIPID command. This command causes the TCP/IP HRNP on the A Series server 100 to associate a single IP address with a network processor and a line on that network processor. As mentioned above, in the present embodiment, the interconnection simulates a traditional network processor from the viewpoint of the A Series server. Line0 is reserved for the simulated FDDI network described in the aforementioned co-pending application Ser. No. 09/088,552, entitled "A Virtual Lan Interface For High-Speed Communications Between Heterogeneous Computer Systems". Line numbers above Line0 can be used for NICs that are to be shared in accordance with the present invention. LANSG maps line numbers to particular adapters as described previously. When the TCPIP HRNP 44 is configured with a particular IP address, it sends the configured IP address to the LLM-stub 86 using a Set Station Interface (SSI) command, along with other miscellaneous data. LANSG 78 receives the SSI command from the LLM-Stub 86, and passes the IP address to the JTD component 182 of the router 80 for inclusion in its tables.

LANSG 78 also maintains a mapping of the IP addresses associated with a particular shared NIC in its tables. The following table illustrates the information maintained for this mapping:

| Adapter Handle | MCP IP Address | NT IP Address |
|---|---|---|
| | | |
| | | |

As shown, for each shared NIC (identified by its Adapter Handle), a mapping is maintained to both the IP address of the network protocol provider on the A Series server 100 that shares that particular NIC, and the IP address of the network protocol provider on the NT server that shares that NIC.

The NIC 50 and its device driver (<nicdrv>.sys) 54 are installed in the normal fashion in accordance with the instructions supplied by the NIC vendor. However, the bindings in Windows NT for the NIC 50 (as well as for any other shared NIC) must be changed from their original settings when the NIC and its driver are installed. Specifically, the Janus NIC driver (JND) and the Janus transport driver (JTD) components of the router 80 need to be inserted into the bindings. All NT transport drivers (e.g., TCPIP.SYS) must be re-bound to "adapters" in the JND. In addition, the JTD must bind as a transport driver to the NIC driver 54. Since JTD is implemented as a module that is linked into LANSG.SYS, LANSG.SYS is actually installed as the transport driver.

In addition to the foregoing, the following new entry is required in the Windows NT Registry—EnableIPRoutingInMCP. This Registry entry is used by the JTD component to designate the TCP/IP HRNP 44 on the A Series server 100 as an IP router for frames with "unknown" IP address and to designate the relationship of the IP router on the A Series server 100 to the IP router on the NT server 102 (if enabled). EnableIPRoutingInMCP may have 3 possible values: "Primary", "Secondary", and "Disabled". If set to "Primary", the JTD always directs any inbound IP or ARP frames with unknown IP addresses to the TCP/IP HRNP 44 on the A Series server 100, via the interconnection. If EnableIPRoutingInMCP is set to "Secondary", then the JTD will only direct any inbound IP or ARP frames with unknown IP address to the TCP/IP HRNP 44 on the A Series server 100, if EnableIPRouting (an existing NT Registry entry) is not set. If EnableIPRouting is set, then it takes precedence and IP or ARP frames with unknown IP addresses will be sent to TCPIP.SYS 58 on the NT server 102. If EnableIPRoutingInMCP is set to "Disabled", then JTD will not direct any inbound IP or ARP frames with unknown IP address to the TCP/IP HRNP 44, but rather will send such frames to TCPIP.SYS 58.

On the A Series server, changes have been made to the CNS 34 software. First, two new attributes have been defined for LAN-type connection groups, as follows:

1. ADAPTERNAME—This is a settable/gettable attribute that is of type "string", with a maximum length of 17 characters. This attribute is used to map a given connection group defined within CNS 34 to the particular shared NIC (e.g., NIC 50) that it represents.
2. ADAPTERTYPE—This is a settable/gettable attribute that identifies the type of adapter to which the ADAPTERNAME attribute refers. In the present embodiment, the ADAPTERTYPE attribute can be set to VLAN (referring to the simulated FDDI network described in the aforementioned co-pending application) or to FASTETHERNET (referring to the types of NICs supported in this embodiment).

On a shared NIC, the router 80 is transparent to both NT TCPIP.SYS 58 and the TCP/IP HRNP 44 on the A Series server 100. NT TCPIP.SYS interfaces with the router 80 as it would normally with a NIC driver through the NDIS interface. The TCP/IP HRNP 44 on the A Series server 100 also interfaces with the router 80 as it would normally with a network interface via LANSG 78. Neither NT TCPIP.SYS 58 nor the A Series TCP/IP HRNP 44 is aware that they are sharing the same NIC. In addition, the NIC driver 54 interfaces to the router 80 as it would normally with an NDIS protocol driver, such as NT TCPIP.SYS.

FIGS. 9A–9C provide further details of the inbound routing functionality of the router 80, in accordance with one embodiment thereof, and also illustrate one embodiment of a method of the present invention. The embodiment illustrated in FIGS. 9A–9C does not, however, support the "loopback" path described above. The functionality is presented in pseudocode form.

Referring to FIG. 9A, in line 200, the router 80 determines from the length field of the MAC header of a frame of data received from the network whether length of the frame is less than or equal to 1500 bytes, in which case the frame is assumed to be an 802.3 frame containing an 802.3 MAC header, an 802.2 LLC header, and an 802.1a SNAP (SubNetwork Attachment Point) header. If that is the case, then at line 202, the router 80 determines from the DSAP field of the LLC header of the frame whether the frame is an SNAP frame. If so, then at line 204, the router 80 determines from the control field of the LLC header whether the frame is also an Unnumbered Information (UI) type frame (i.e., a frame type used for "information" (data) frames in the 802.2 LLC protocol. If the frame is not a UI frame, then it is identified as having an UNKNOWN type, and a corresponding value is stored in a type of frame_rcvd variable at line 208 to indicate the UNKNOWN type. If in line 204, the frame is determined to be a UI frame, then at lines 206, the router 80 further determines whether the frame is an IP frame, an ARP frame, or an UNKNOWN type, and stores the identified type in the type_of frame_rcvd variable.

If in line 202, the frame is not determined to be a SNAP frame, then at lines 210, the router 80 determines from the DSAP field of the LLC header and from a lookup_source_addro function in LANSG 78 (which searches the list of LANSG stations looking for a match between a remote address in the station table entry and the source MAC address in the frame), whether the frame is intended for the BNAv2 HRNP 42 on the A Series server 100. If so, then at line 212, the frame is identified as such by storing a corresponding value in the type_of frame_rcvd variable. If the frame is not identified as a BNAv2 frame, then the frame is assigned an UNKNOWN type at one of the lines 214.

If in step 200, the incoming frame does not have a length less than or equal to 1500 bytes, then it is assumed to be either an Ethernet frame or a large BNAv2 frame. At line 216, the router 80 checks the DSAP field of the LLC header of the frame to determine if it could be a BNAv2 frame. If so, then at line 218, the router 80 invokes a lookup_source_addr( ) function, passing it the source_addr field of the MAC header of the frame, which determines from that information whether the frame is addressed to the BNAv2 HRNP 42 on the A Series server 100. If so, the lookup_source_addro function returns a pointer to the station that represents a connection to that BNAv2 HRNP. Then, in line 220, the type_of_frame_rcvd variable is set to "BNA." If, however, no BNAv2 HRNP is identified in line 218, then the frame is assigned the UNKNOWN type in line 222.

If in line 216, the frame is determined not to have the characteristics of a BNAv2 frame, then it should be either an IP frame or an ARP frame. In lines 224, the router 80 determines from the type field of the Ethernet MAC header which of these frame types has in fact been received. If the type cannot be determined, the frame is simply identified as an UNKNOWN type.

Once the type of the received frame has been determined, the frame must be routed to the appropriate network protocol provider. In the case of an IP or ARP frame, the dest_addr field of the IP header of the frame is first examined to determine if the frame is to be "broadcast" to all IP addresses on the network (line 226). If so, then an ip_addr_owner variable is set to indicate that both the network protocol provider on the A Series server 100 (e.g., TCP/IP HRNP 44) and the network protocol provider on the NT server 102 (e.g., TCPIP.SYS 58) are to receive the frame. If the frame is not a broadcast frame, it is first assumed that it is addressed to neither network protocol provider 44, 58 (line 228). In lines 230, the router 80 determines which of the network protocol providers 44, 58 is to receive the frame, and sets the ip_addr_owner variable accordingly. In lines 232, the frame is then routed to the appropriate network protocol provider based on the value of ip_addr_owner. For example, if the frame is to be routed to the TCP/IP HRNP 44 on the A Series server, the router 80 passes the frame to the LANSG 78 module, which, in combination with the other components of the interconnection, passes the frame to the A Series server 100 via the physical connection for forwarding to that network protocol provider. If, instead, the frame is to be received by the network protocol provider (TCPIP.SYS 58) on the NT server 102, then the router 80 passes the frame to that network protocol provider via appropriate calls to the NDIS interface. If ip_addr_owner indicates that neither network protocol provider was determined to be the addressee of the frame, then the router 80 routes the frame based on the values of the EnableIPRoutingInMCP and EnableIPRouting entries in the Windows NT Registry (described above).

In the case of a BNAv2 frame (lines 234), the router 80 passes the frame to the LANSG module 78 along with the pointer to the station that represents a connection to the BNAv2 HRNP that is to receive the frame. In the case of an UNKNOWN frame type (lines 236), the frame is passed to the NDIS interface for handling of unknown frame types.

Figure 10A:
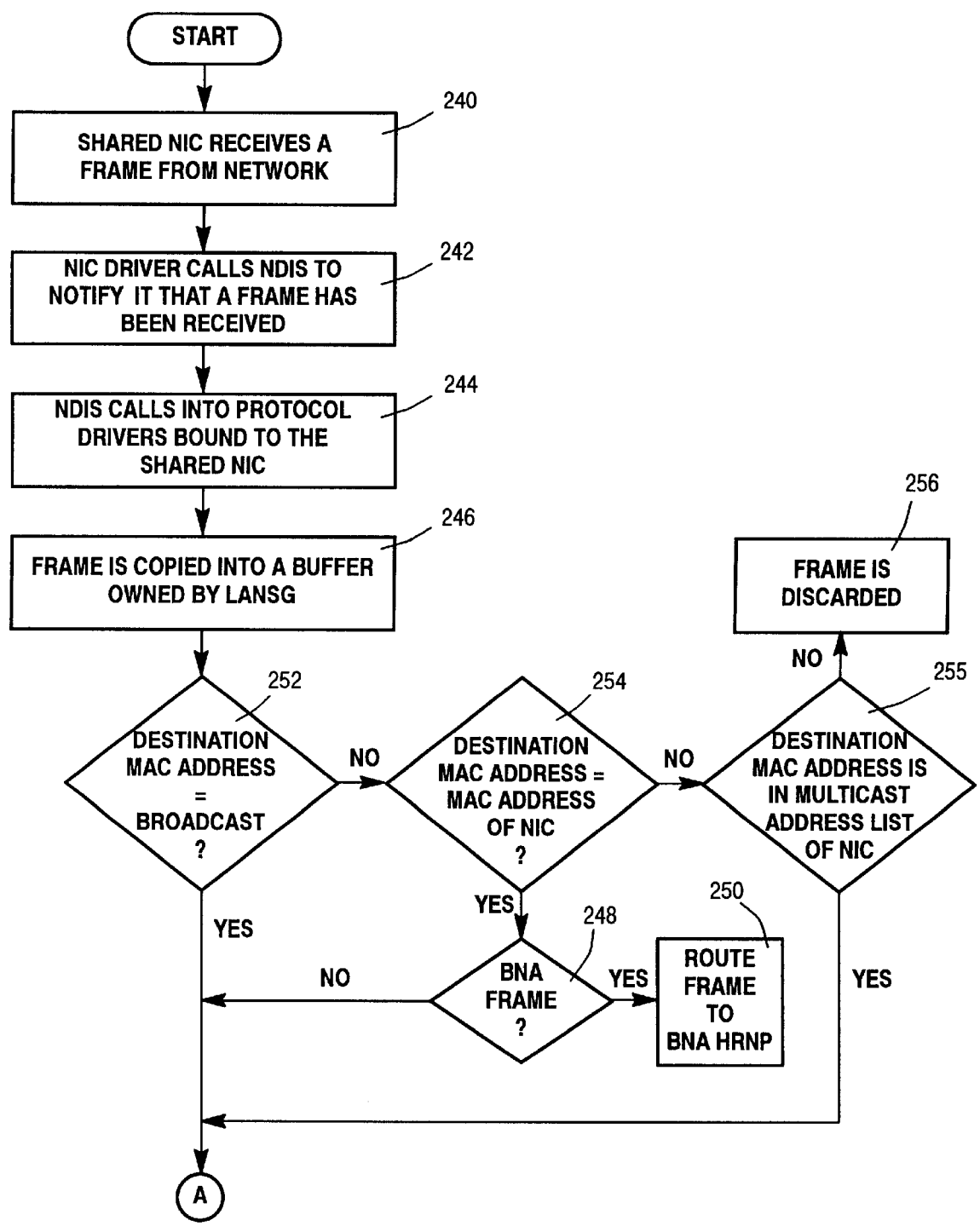
FIGS. 10A–D are flow diagrams illustrating further details of another embodiment of the routing functionality of the router of the present invention, and also another embodiment of the method of the present invention.
Figure 10B:
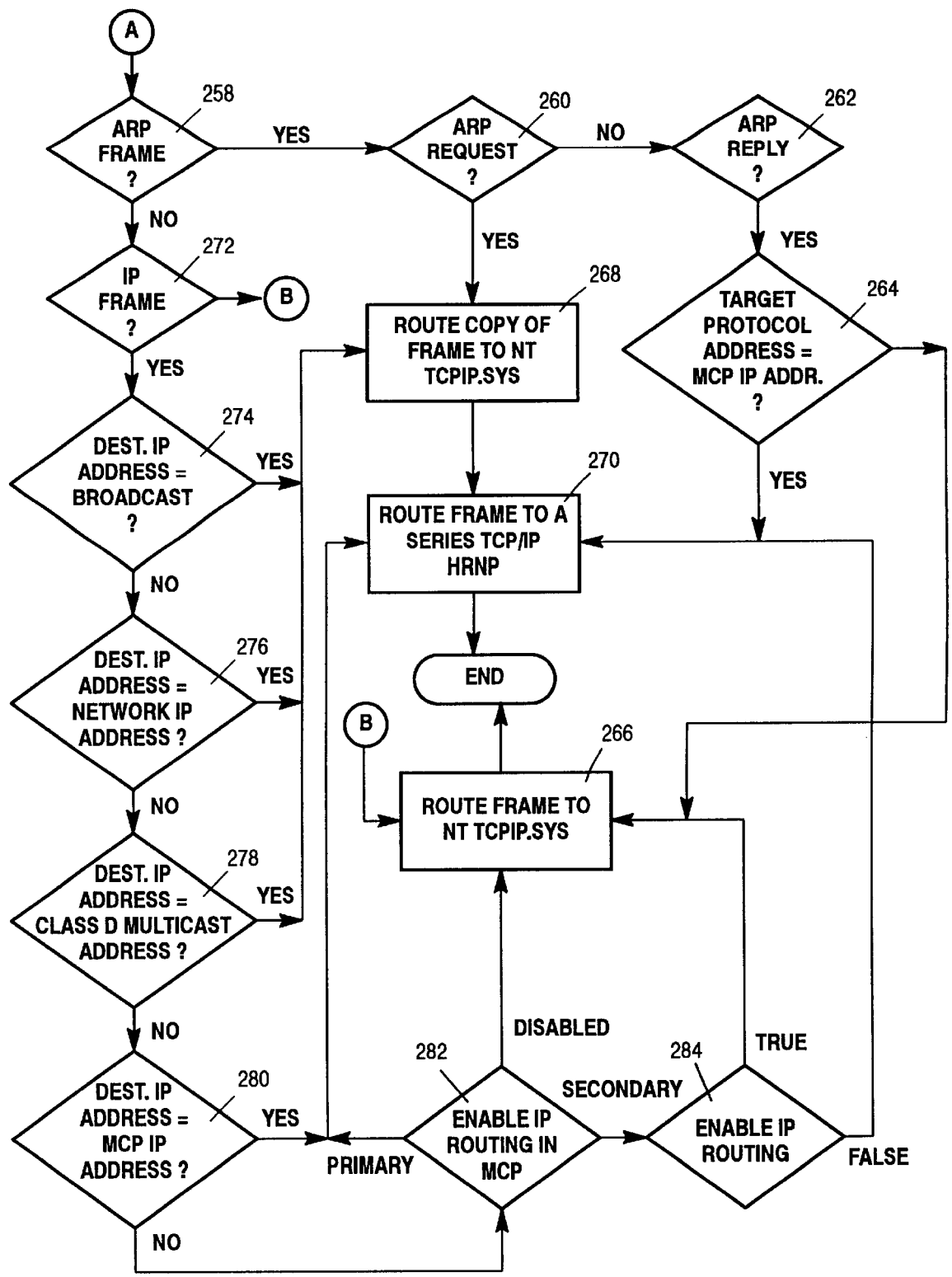
Figure 10C:
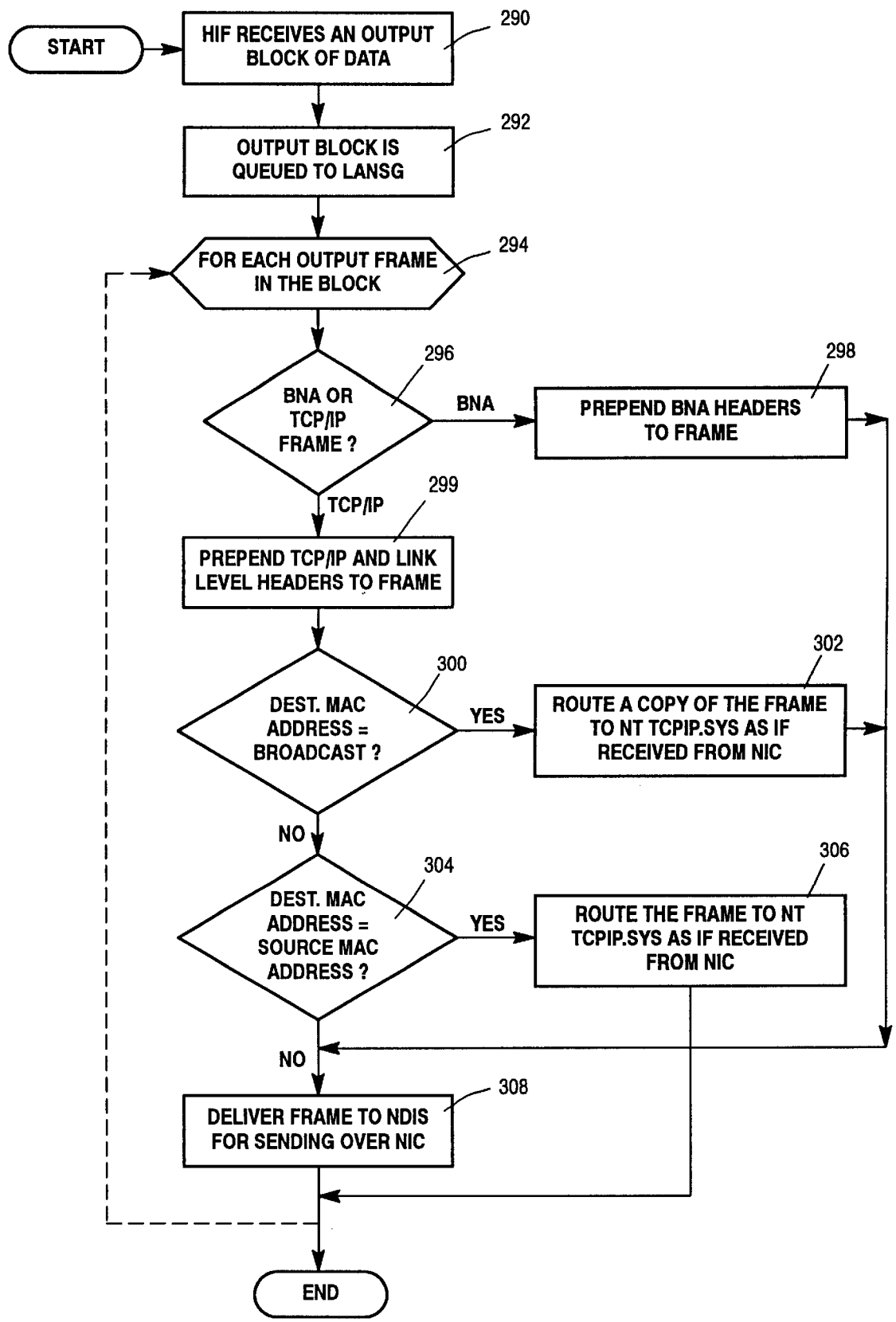

FIGS. 10A–D comprise flow diagrams that illustrate another, preferred embodiment of the routing functionality of the router 80, as well as a preferred embodiment of the method of the present invention. In this embodiment, the "loopback" feature is supported. FIGS. 10A–10B illustrates the steps performed by the router 80 when a frame of data is received from the network 15 via the shared NIC 50. FIG. 10C illustrates the steps performed by the router 80 when a frame of data is sent by a network protocol provider on the A Series server 100 for output to the network 15 via the shared NIC 50. FIG. 1 OD illustrates the steps taken when a frame of data is sent by a network protocol provider on the NT server 102 for output to the network 15 via the shared NIC 50.

Referring to FIGS. 10A–10B, at step 240, the NIC 50 receives an incoming frame from the network 15. At step 242, the NIC driver 54 calls the NDIS interface to notify it that a frame has been received. At step 244, NDIS calls all Protocol Drivers that are "bound" to the shared NIC 50. In the present embodiment, the JTD component 182 of the router 80 is such a bound protocol driver. As explained above, the JTD component 182 appears to NDIS as a typical protocol driver.

At step 246, the frame is copied into a buffer owned by the LANSG module 78. Next, at step 252, the router 80 checks the Destination MAC Address in the frame to determine whether it matches the broadcast address. If so, control passes to step 258 (FIG. 10B). If the Destination MAC Address is not the broadcast address (step 252), then at step 254, the router 80 determines whether the Destination MAC address matches the MAC Address of the NIC 50. If not, then at step 255, the router 80 checks whether the Destination MAC Address is in the Multicast Address List of the NIC. If not, then the frame is discarded at step 256. If the Destination MAC Address is in the Multicast Address List of the NIC, then control passes to step 258 (FIG. 10B).

If in step 254, the Destination MAC Address is found to match the MAC Address of the NIC, then control passes to step 248, where the router 80 (specifically the JTD component 182 in the embodiment illustrated in FIG. 8) determines from the frame whether it is intended for the BNAv2 HRNP 42 on the A Series system. If so, the frame is passed by LANSG 78 to that BNAv2 HRNP via the HIF at step 250. If the frame is not intended for the BNAv2 HRNP 42, then control passes to step 258 of FIG. 10B.

Referring now to FIG. 10B, at step 258, the router 80 determines whether the frame is an ARP frame. If so, then it is either an ARP request or an ARP reply (determined at steps 260 and 262, respectively). If the frame is an ARP Request, then a copy of the frame is routed to the TCPIP.SYS 58 driver on the NT server 102 at step 268, and the frame itself is routed to the TCP/IP HRNP 44 on the A Series system via the HIF at step 270. If the ARP frame is an ARP Reply, then at step 264, the router 80 determines whether the target protocol address matches the IP address of the TCP/IP HRNP 44 on the A Series server 102. If so, the frame is routed to that network protocol provider via the HIF at step 270. If not, the frame is routed via NDIS to the TCPIP.SYS driver 58 on the NT server 102 at step 266.

If the frame is not an ARP frame, but is an IP frame (step 272), then steps 274 through 278 are performed to determine whether the Destination IP Address of the IP frame is either the broadcast address (step 274), the network IP address (step 276), or a Class D Multicast address (step 278). If the destination IP address of the IP frame is any of these, then a copy of the frame is routed to both the TCPIP.SYS driver 58 on the NT server 102 via NDIS (step 268) and to the TCP/IP HRNP 44 on the A Series server 100 via the HIF (step 270). If in step 272, the frame is determined not to be an IP frame, then control passes to step 266 where the frame is routed only to the NT TCPIP.SYS 58.

If the destination IP address is neither of the types checked in steps 274 through 278, then control passes to step 280 where the router 80 determines whether the destination IP address matches that of the TCP/IP HRNP 44 on the A Series system. If so, then the frame is routed to that network protocol provider via the HIF at step 270. If not, then at step 282, the router 80 checks the EnableIPRoutingInMCP entry in the Windows NT Registry. If that entry is set to "Primary", then the frame is routed to the TCP/IP HRNP 44 on the A Series system via the HIF at step 270. If the entry is set to "Disabled", then the frame is routed to the TCPIP.SYS driver on the NT server 102 via NDIS at step 266. If the EnableIPRoutingInMCP entry is set to "secondary", then control passes to step 284, where the router 80 checks the EnableIPRouting entry in the Registry. If the EnableIPRouting entry is set to "True," then the frame is routed to the TCPIP.SYS driver 58 on the NT server 102 via NDIS at step 266. If the EnableIPRouting entry is set to "False," then the frame is routed to the TCP/IP HRNP 44 on the A Series server 100 via the HIF at step 270.

FIG. 10C illustrates the steps performed by the router 80 when a block of data containing frames to be output over the NIC 50 are sent via the HIF from a network protocol provider (e.g., either a BNAv2 HRNP or a TCP/IP HRNP) on the A Series server 100. At step 290, a block of data from the network protocol provider is received on the NT server 102 via the HIF. At step 292, the block of data is queued to the LANSG module 78. As indicated at step 294, steps 296 through 308 are applied to each frame in the received block.

For a given frame, at step 296, the LANSG module 78 determines whether the frame is from a BNAv2 HRNP or a TCP/IP HRNP. If the frame is a BNAv2 frame, then at step 298, the LANSG module 78 prepends BNA headers to the frame in accordance with the BNAv2 protocol, prepends the link level headers, and then delivers the frame to NDIS for output over the NIC 50 (step 308).

If instead, the frame is from a TCP/IP HRNP, then at step 299, the LANSG module 78 prepends TCP/IP and link level headers to the frame. Next, at step 300, the router 80 determines whether the destination MAC address is the broadcast address. If so, then at step 302 the router 80 routes a copy of the frame to the TCPIP.SYS driver 58 on the NT server 102 via NDIS, as if the frame had been received by the NIC 50. Next, at step 308, the frame is also routed to the network 15 via the shared NIC 50.

If the destination MAC address of the frame is not the broadcast address, but instead matches the source MAC address, then at step 306, the router 80 routes the frame to the TCPIP.SYS driver 58 on the NT server 102 via NDIS, as if the frame had been received by the NIC 50. If the destination MAC address of the frame matches neither the broadcast address nor the source MAC address, then the frame is simply routed to the network 15 via the shared NIC 50 at step 308. Note that, in the above description, steps 302 and 306 represent the "loopback" capability of the router 80 of the present invention.

Figure 10D:
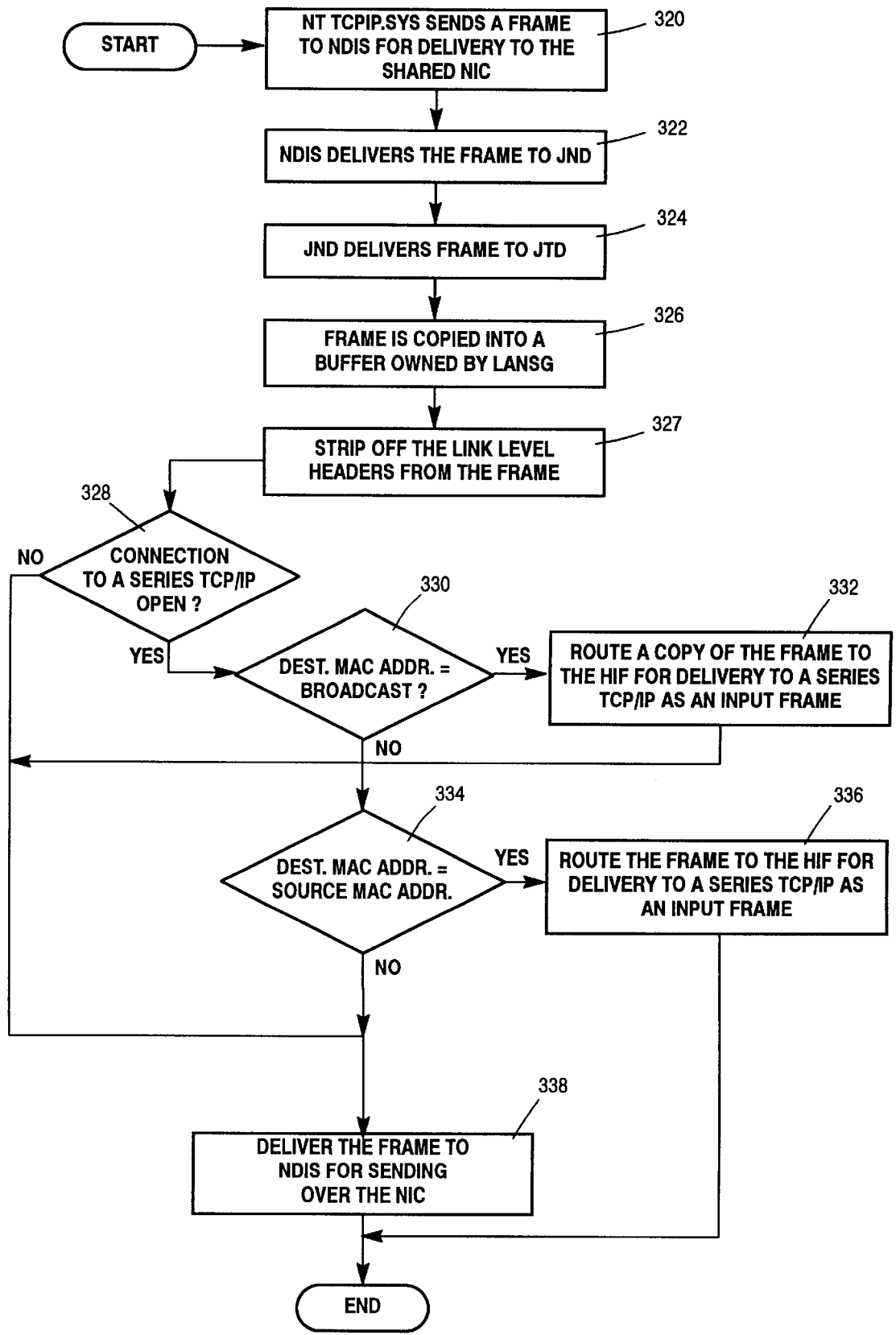

FIG. 10D illustrates the steps performed when a frame is sent for output by the network protocol provider (e.g., TCPIP.SYS 58) on the NT server 102. The outgoing is frame is passed via a call to the NDIS interface at step 320. At step 322, NDIS delivers the frame to the router 80 (specifically the JND component 184 in the embodiment of FIG. 8). At step 324, the JND component 184 passes the frame to the JTD component 182, which, in the present embodiment, is part of the LANSG module 78. Next, at step 326, the frame is copied into a buffer provided by LANSG 78.

Next, at step 327, the link level headers are stripped from the frame. At step 328, the router 80 determines whether a connection to the TCP/IP HRNP on the A Series server 100, via the HIF, is open. If not, then the router 80 (specifically the JTD component 182) simply routes the frame to the NIC 50 via NDIS at step 338.

If at step 328, a connection to the TCP/IP HRNP on the A Series server 100 is identified, then at step 330, the router 80 determines whether the destination MAC address of the frame matches the broadcast address. If so, then at step 332, a copy of the frame is routed to the TCP/IP HRNP on the A Series server 100 via the HIF (as if it had been received by the NIC 50), and the frame itself is routed to the NIC 50 via NDIS at step 338. If the destination MAC address of the frame does not match the broadcast address, then at step 334, the router 80 determines whether the destination MAC address matches the source MAC address. If so, then at step 336, the frame is only routed to the TCP/IP HRNP on the A Series server 100 via the HIF. If the destination MAC address of the frame matches neither the broadcast address nor the source MAC address, then the frame is only routed to the NIC 50 via NDIS at step 338. Again, note that, in the above description, steps 332 and 336 represent the "loopback" capability of the router 80 of the present invention.

As the foregoing illustrates, the present invention is directed to methods and apparatus that enable a first network protocol provider, executing on a first computer system and having a first network address associated therewith, and a second network protocol provider, executing on a second computer system and having a second network address associated therewith, to both send and receive data over a network via a same network interface card installed on the second computer system. It is understood that changes may be made to the embodiments described above without departing from the broad inventive concepts thereof. For example, while the present invention is described above in the context of a system comprising an A Series server and an NT server, it is understood that the methods and apparatus of the present invention can be employed with any two computer systems, whether of the same or different types. Also, while in the most preferred embodiment, the router 80 is described as comprising a JTD component and a JND component, other embodiments may implement the router functionality as a different combination of components or as a single component. Additionally, the interconnection of the present invention is not limited to the particular embodiments disclosed. Rather, the term "interconnection" is intended to encompass other methods and apparatus for transferring data between the I/O subsystems of the first and second computer systems. For example, other embodiments may not require the functionality of the QSP and LANSG components. Rather, a more direct interface between the interconnection device driver (ICD) and the router could be employed. Accordingly, the present invention is not limited to the particular embodiments disclosed, but is intended to cover all modifications that are within the spirit and scope of the invention as defined by the appended claims.

What is claimed is:

1. Apparatus enabling a first network protocol provider, executing on a first computer system and having a first network address associated therewith, and a second network protocol provider, executing on a second computer system and having a second network address associated therewith, to each independently access a network via a same network interface card installed on the second system, comprising:

an interconnection between an input/output (I/O) subsystem of the first computer system and an I/O subsystem of the second computer system, over which data can be transmitted between systems; and a router executing on the second computer system that passes data received by said network interface card to the first network protocol provider, via the interconnection using a data transfer protocol native to the interconnection, wherein said data transfer protocol of the interconnection is different from that used by the first and second network protocol providers to communicate over the network, when a network address received with the data matches the first network address, and that passes the received data to the second network protocol provider when the network address received with the data matches the second network address.

2. The apparatus recited in claim 1, wherein the router further operates to independently direct data from either of the first and second network protocol providers to the network via said same network interface card in a manner transparent to both network protocol providers.

3. The apparatus recited in claim 1, wherein when one of said first and second network protocol providers addresses data to the other, the router further operates to pass that data to said other network protocol provider directly, bypassing the network interface card in a manner transparent to both network protocol providers.

4. The apparatus recited in claim 1, wherein when data is received via the network interface card that is intended to be broadcast to all network protocol providers, the router detects such data and passes it to both the first and second network protocol providers.

5. The apparatus recited in claim 1, wherein when one of said first and second network protocol providers sends data to be output that has a broadcast address, the router operates to route that data to the network via said same network interface card and also to route that data to the other network protocol provider via the interconnection.

6. The apparatus recited in claim 1, wherein the router simulates the operation of a network protocol provider when interfacing with a device driver of the network interface card, and the router simulates the operation of a device driver of the network interface card when interfacing with the first and second network protocol providers, whereby the functionality of the router is transparent to the network interface card and to the first and second network protocol providers.

7. The apparatus recited in claim 1, wherein the second system comprises an NT server and wherein the network interface card has a device driver installed on the second system that controls access to the NIC, and further wherein the NIC device driver and the network protocol provider on the NT server interface to the router via the Network Driver Interface Specification (NDIS).

8. The apparatus recited in claim 1, wherein the router creates and maintains a table containing the network addresses of the first and second network protocol providers.

9. The apparatus recited in claim 1, wherein the first network protocol provider comprises an implementation of the TCP/IP protocol on the first computer system, and wherein the second network protocol provider comprises an implementation of the TCP/IP protocol on the second computer system.

10. The apparatus recited in claim 1, wherein the first network protocol provider comprises a plurality of network protocol providers each having a network address associated therewith.

11. The apparatus recited in claim 10, wherein the first network protocol provider comprises one of a TCP/IP network protocol provider and a BNAv2 network protocol provider.

12. The apparatus recited in claim 1, wherein the interconnection between the first computer system and the second computer system comprises:

a physical connection between the I/O subsystem of the first computer system and the I/O subsystem of the second computer system over which data can be transmitted between them; and an interconnection device driver on the second computer system that controls access by other modules on the second computer system to the physical connection.

13. The apparatus recited in claim 12, wherein the interconnection between the first and second computer systems further comprises a queue service provider on the second computer system that multiplexes multiple dialogs between systems over the physical connection.

14. The apparatus recited in claim 12 wherein the first computer system comprises a Unisys A Series server and the second computer system comprises an NT server, and wherein the physical connection comprises a connection between a CS-Bus interface of the I/O subsystem of the A Series server and an I/O bus of the I/O subsystem of the NT server.

15. The apparatus recited in claim 14 wherein the I/O bus of the I/O subsystem of the NT server comprises an EISA bus.

16. The apparatus recited in claim 12 wherein the first computer system comprises a Unisys A Series server and the second computer system comprises an NT server, and wherein the physical connection comprises a connection between a port of a Channel Manager Unit (CMU) of the I/O subsystem of the A Series server and an I/O bus of the I/O subsystem of the NT server.

17. The apparatus recited in claim 16, wherein the I/O bus of the I/O subsystem of the NT server comprises a PCI bus.

18. The apparatus recited in claim 12 wherein the first computer system, including a memory space of the first computer system, and its I/O subsystem are emulated within the second computer system, and wherein the physical connection is emulated as a memory-to-memory connection between the memory space of the emulated first computer system and the memory space of the second computer system.

19. The apparatus recited in claim 12 wherein the interconnection device driver interfaces with another module on the second computer system via a procedural interface in which procedures of the interconnection device driver and procedures of the other module are registered so as to isolate the functionality of the interconnection device driver from the other module in order to permit different physical connections to be employed with correspondingly different interconnection device drivers in a manner that is transparent to said other module.

20. In a system comprising a first computer system and a second computer system, wherein a first network protocol provider executes on the first computer system and has a first network address associated therewith, and a second network protocol provider executes on the second computer system and has a second network address associated therewith, and further wherein an interconnection between an input/output (I/O) subsystem of the first computer system and an I/O subsystem of the second computer system enables data to be transferred between them, a method for enabling each of said first and second network protocol providers to independently access a network via a same network interface card installed on the second system, said method comprising:

routing data received by said network interface card to the first network protocol provider, via the interconnection using a data transfer protocol native to the interconnection, wherein said data transfer protocol of the interconnection is different from that used by the first and second network protocol providers to communicate over the network, when a network address received with the data matches the first network address; and routing the received data to the second network protocol provider when the network address received with the data matches the second network address.

21. The method recited in claim 20, further comprising independently routing data from either of the first and second network protocol providers to the network via said same network interface card in a manner transparent to both network protocol providers.

22. The method recited in claim 20, wherein, when one of said first and second network protocol providers addresses data to the other, the method further comprises routing that data to said other network protocol provider directly, via the interconnection, thereby bypassing the network interface card in a manner transparent to both network protocol providers.

23. The method recited in claim 20, wherein, when data is received via said same network interface card that is intended to be broadcast to all network protocol providers on the network, the method further comprises routing such data to both the first network protocol provider, via the interconnection, and the second network protocol provider.

24. The method recited in claim 20, wherein, when one of said first and second network protocol providers sends data to be output that has a broadcast address, the method further comprises routing that data to the network via said same network interface card and also routing that data to the other network protocol provider via the interconnection.

* * * * *